(12) United States Patent
Haikin et al.

(10) Patent No.: US 8,760,561 B2
(45) Date of Patent: Jun. 24, 2014

(54) IMAGE CAPTURE FOR SPECTRAL PROFILING OF OBJECTS IN A SCENE

(75) Inventors: John Haikin, Fremont, CA (US); Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/402,526

(22) Filed: Feb. 22, 2012

(65) Prior Publication Data

US 2012/0213407 A1 Aug. 23, 2012

Related U.S. Application Data

(63) Continuation-in-part of application No. 13/033,578, filed on Feb. 23, 2011, now abandoned, and a continuation-in-part of application No. 13/079,677, filed on Apr. 4, 2011, now abandoned.

(51) Int. Cl.
*H04N 5/225* (2006.01)

(52) U.S. Cl.
USPC .................... 348/342; 348/222.1; 348/333.02

(58) Field of Classification Search
USPC ............ 348/89, 91, 93, 207.99, 231.3, 231.6, 348/272, 333.11, 222.1, 333.02, 342; 382/100, 111, 164, 165, 305; 358/1.13
See application file for complete search history.

(56) References Cited

U.S. PATENT DOCUMENTS

| | | | |
|---|---|---|---|
| 6,480,273 B1 | 11/2002 | Brock et al. | |
| 6,516,154 B1 | 2/2003 | Parulski et al. | |
| 6,678,395 B2 | 1/2004 | Yonover et al. | |
| 6,970,199 B2 | 11/2005 | Venturino et al. | |
| 7,068,840 B2 | 6/2006 | Risson | |
| 7,554,586 B1 | 6/2009 | Imai et al. | |
| 7,680,337 B2 | 3/2010 | Gruninger et al. | |
| 7,689,035 B2 | 3/2010 | Mallick et al. | |
| 7,751,653 B2 | 7/2010 | Bodnar et al. | |
| 7,788,144 B2 | 8/2010 | Vaschillo et al. | |
| 7,809,162 B2 | 10/2010 | Steinberg et al. | |
| 2003/0053686 A1 | 3/2003 | Luo et al. | |
| 2003/0063204 A1* | 4/2003 | Suda | 348/272 |
| 2004/0208373 A1 | 10/2004 | Aoki et al. | |
| 2005/0057670 A1 | 3/2005 | Tull et al. | |
| 2007/0058921 A1 | 3/2007 | Lundgren et al. | |
| 2007/0081090 A1* | 4/2007 | Singh | 348/333.11 |
| 2007/0081182 A1* | 4/2007 | Shiohara | 358/1.13 |
| 2007/0121132 A1 | 5/2007 | Blinn et al. | |

(Continued)

OTHER PUBLICATIONS

U.S. Appl. No. 12/949,592, filed Nov. 18, 2010, Applicant: Francisco Imai.

(Continued)

*Primary Examiner* — Lin Ye
*Assistant Examiner* — Dennis Hogue
(74) *Attorney, Agent, or Firm* — Fitzpatrick, Cella, Harper & Scinto

(57) ABSTRACT

Image data of a scene is captured. Spectral profile information is obtained for the scene. A database of plural spectral profiles is accessed, each of which maps a material to a corresponding spectral profile reflected therefrom. The spectral profile information for the scene is matched against the database, and materials for objects in the scene are identified by using matches between the spectral profile information for the scene against the database. Metadata which identifies materials for objects in the scene is constructed, and the metadata is embedded with the image data for the scene.

48 Claims, 18 Drawing Sheets

(56) References Cited

U.S. PATENT DOCUMENTS

| | | |
|---|---|---|
| 2008/0294017 A1 | 11/2008 | Gobeyn et al. |
| 2009/0193055 A1* | 7/2009 | Kuberka et al. ............ 707/104.1 |
| 2009/0201309 A1 | 8/2009 | Demos |
| 2009/0213379 A1 | 8/2009 | Carroll et al. |
| 2009/0231455 A1 | 9/2009 | Emery |
| 2009/0280859 A1 | 11/2009 | Bergh |
| 2009/0304278 A1 | 12/2009 | Steinberg et al. |
| 2010/0046060 A1 | 2/2010 | Lee et al. |
| 2010/0046077 A1 | 2/2010 | Lee et al. |
| 2010/0053755 A1 | 3/2010 | Lee et al. |
| 2010/0079621 A1 | 4/2010 | Jang |
| 2010/0080414 A1* | 4/2010 | Nonaka ........................ 382/100 |
| 2010/0182598 A1 | 7/2010 | Choi et al. |
| 2010/0232706 A1 | 9/2010 | Forutanpour |
| 2011/0026853 A1* | 2/2011 | Gokturk et al. ............... 382/305 |
| 2012/0044380 A1 | 2/2012 | Imai |
| 2012/0050565 A1 | 3/2012 | Imai |

OTHER PUBLICATIONS

NSF Award Abstract #0637440, "STTR Phase I: High Resolution Spectrometer-on-a-Chip Based on Nano-Optic Plasmonic Device", amended Dec. 5, 2006.

International Search Report and Written Opinion dated May 2, 2012 in PCT/US2012/026318.

M.J. Vhrel, et al., "Measurement and analysis of object reflectance spectra", Color Res. and Appl. vol. 19, pp. 4-9, 1994.

* cited by examiner

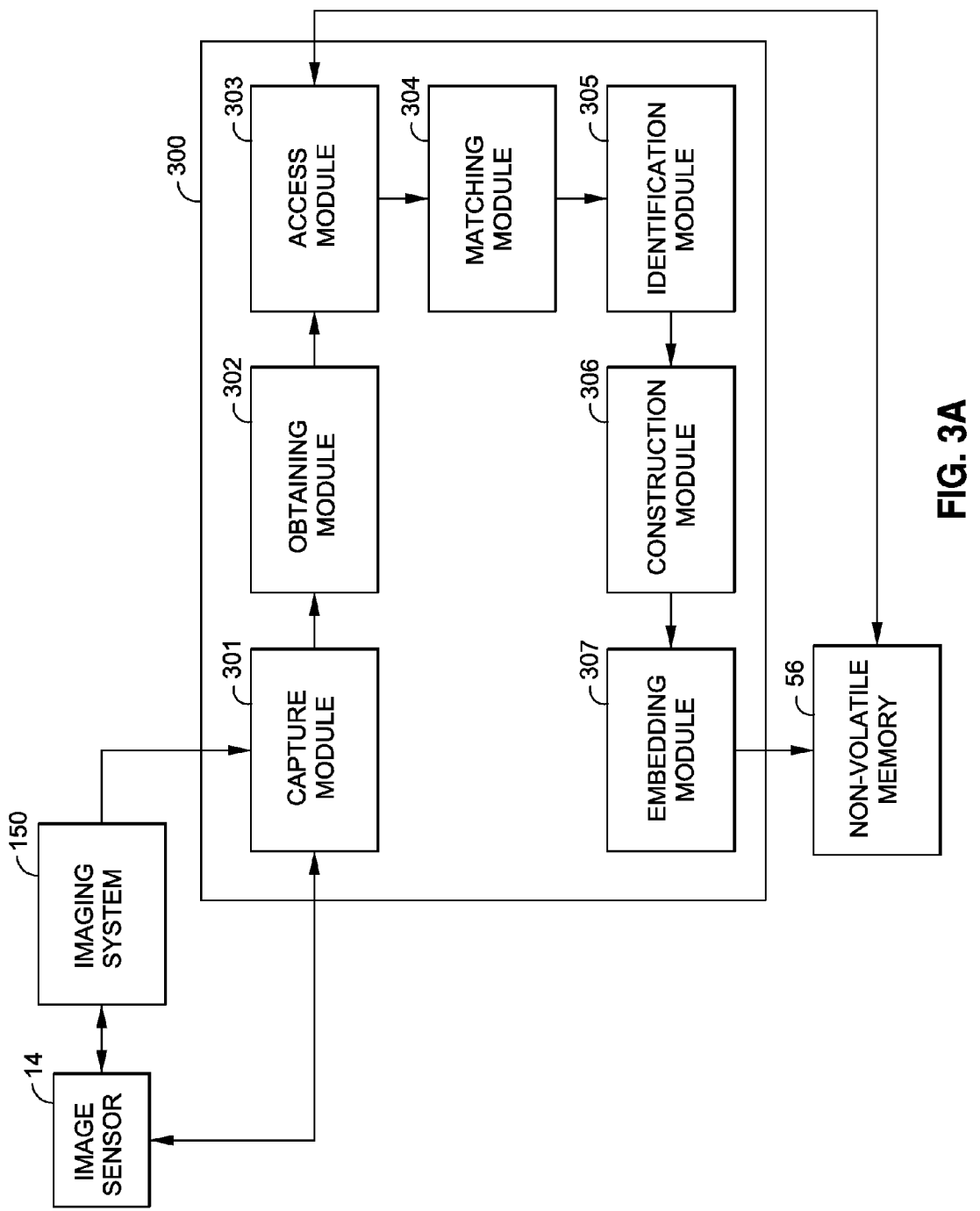

Description Metadata:

Title
Subject
Rating
Tags
Comment

File metadata:

Name
Item type
Folder path
Data created
Data modified
Size
Owner

Origin Metadata:

Authors
Data taken
Program name
Data acquired
Copyright

Camera Metadata:

Camera maker
Camera model
F-stop
Exposure time
ISO speed
Exposure bias
Focal length
Max aperture
Metering mode
Subject distance
Flash mode
Flash energy
35 mm focal length

Advanced photo metadata:

Lens maker
Lens model
Camera serial number
Contrast
Brightness
Light source
Exposure program
Saturation
Sharpness
White balance
Photometric interpretation
Digital zoom
EXIF version

Image Metadata:

Image ID
Dimensions
Width
Height
Horizontal resolution
Vertical resolution
Bit depth
Compression
Resolution unit
Color representation
Compressed bits/pixel

Material Metadata:

Eigenvectors

Material 1
Coordinates (x1l,x1r,y1u,y1d)
Coefficients eigenvectors A1

Material 2
Coordinates (x2l,x2r,y2u,y2d)
Coefficients eigenvectors A2

....

Material n
Coordinates (xnl,xnr,ynu,ynd)
Coefficients eigenvectors An

IMAGE CAPTURE FOR SPECTRAL PROFILING OF OBJECTS IN A SCENE

CROSS-REFERENCE TO RELATED APPLICATIONS

This application is a continuation-in-part of U.S. application Ser. No. 13/033,578, filed Feb. 23, 2011, and U.S. application Ser. No. 13/079,677, filed Apr. 4, 2011, and claims the benefit of such applications, the contents of which are hereby incorporated by reference as if fully stated herein.

FIELD

The present disclosure relates to image capture and to post-capture processing such as rendering of the captured image.

BACKGROUND

In the field of image capture, it may be desirable to adjust photographs according to the material being photographed. For example, if a model is wearing a black velvet jacket over black leather pants, the photographer might want to render the final photo in such a manner as to differentiate the jacket from the pants.

SUMMARY

Current photographic processes make little distinction between similar colors, and the routine post-shooting edition typically cannot rely only on camera signals to identify areas of the image (e.g., making a distinction between a black velvet jacket over black leather pants). Accordingly, an artist or photographer must attempt to visually identify distinct areas for separate post-processing, which can be difficult and time-consuming.

The foregoing situation is addressed by matching spectral profiles of objects in a scene so as to identify materials for the objects, and storing the identity of the materials in metadata together with image data for the scene for use during post-capture rendering.

Thus, in an example embodiment described herein, image data of a scene is captured. Spectral profile information is obtained for the scene. A database of plural spectral profiles is accessed, each of which maps a material to a corresponding spectral profile reflected therefrom. The spectral profile information for the scene is matched against the database, and materials for objects in the scene are identified by using matches between the spectral profile information for the scene against the database. Metadata which identifies materials for objects in the scene is constructed, and the metadata is embedded with the image data for the scene.

By matching spectral profiles of objects in a scene so as to identify materials for the objects, and storing the materials in metadata together with image data for the scene for use during post-capture rendering, it is ordinarily possible to automatically identify distinct areas of an image for separate post-processing, without requiring the intervention of an artist or photographer.

According to another architecture proposed herein, during image capture a preview of a scene is displayed, and a user is provided with a user interface to select regions in the scene for which to capture spectral profile information. Spectral profiles of objects in the scene which fall within the region of interest are matched so as to identify materials for the objects, and the materials are stored in metadata together with image data for the region of interest for use during post-capture rendering.

Thus, in another example embodiment described herein, preview image data of a scene is captured. A designation of a region of interest is accepted in the preview image data. Spectral image data of the scene is captured, and spectral profile information for the region of interest is calculated by using the captured spectral image data for the scene. A database of plural spectral profiles is accessed, of which each profile maps a material to a corresponding spectral profile reflected therefrom. The spectral profile information for the region of interest is matched against the database, and materials for objects in the region of interest are identified by using matches between the spectral profile information for the region of interest against the database. Metadata which identifies materials for objects in the region of interest and which identifies location of the region of interest relative to the scene is constructed. The metadata is stored together with image data for the scene.

By matching spectral profiles of objects in a selected region of interest so as to identify materials for the objects, and storing the materials in metadata together with image data for the selected region of interest for use during post-capture rendering, it is ordinarily possible to automatically identify distinct areas of an image for separate post-processing without requiring the intervention of an artist or photographer. In addition, because the calculation and storage of spectral profile information can be limited to the region of interest, it is ordinarily possible to conserve memory and processing resources.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 3A and 3B are views for explaining an image capture module according to example embodiments.

FIGS. 12 and 13 are views for explaining metadata according to example embodiments.

DETAILED DESCRIPTION

In the following example embodiments, there is described a multi-spectral digital camera which may be a digital still camera or a digital video camera. It is understood, however, that the following description encompasses arbitrary arrangements which can incorporate or utilize imaging assemblies having a spectral response, for instance, a data processing apparatus having an image sensing function (e.g., a personal computer) or a portable terminal having an image sensing function (e.g., a mobile telephone).

Figure 1A:
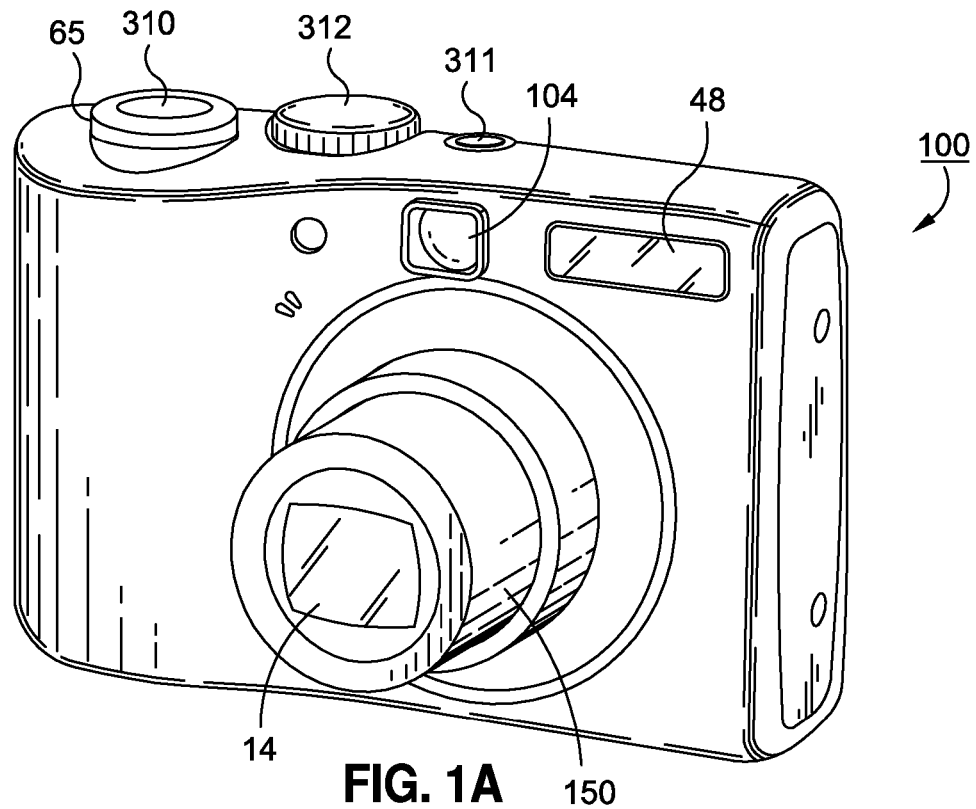
FIGS. 1A and 1B are views depicting an external appearance of an image capture device according to an example embodiment.
Figure 1B:
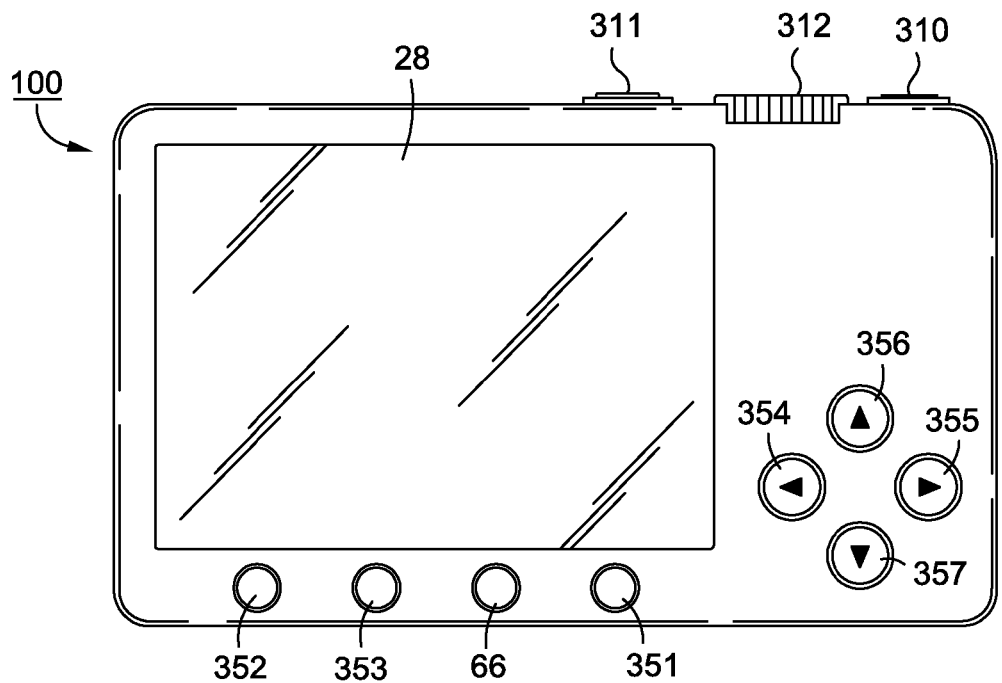

FIGS. 1A and 1B are views showing an example of an external appearance of an image capture device 100 according to an example embodiment. Note in these figures, some components are omitted for conciseness. A user operates buttons and switches 66, 310 to 312 and 351 to 357 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 that is inside camera 100 is an image sensor which converts an optical image into an electrical signal. In some embodiments, image sensor 14 may be tunable in accordance with a capture parameter. Image sensor 14 will be described more fully below with respect to FIG. 2A.

Imaging system 150 is a camera system which is incorporated with the image sensor 14 in order to provide additional capabilities for capturing spectral information. In that regard, several arrangements are possible for imaging system 150, including a monochrome imaging sensor combined with a filter wheel or a liquid crystal tunable filter, an absorption filter, an additional array of spectral sensing devices, or a color imaging system with tunable spectral sensitivities. These example embodiments are described more fully below with respect to FIGS. 1C to 1G. In addition, in another embodiment, image sensor 14 itself may be able to capture higher-resolution spectral data (e.g., higher than the three channels for RGB). Imaging system 150 also could be an array of high-spectral resolution sensors that directly measure spectral information such as based on metal waveguides producing surface plasmon polaritons.

The power button 311 is provided to start or stop the digital camera 100, or to turn ON/OFF the main power of the digital camera 100. The menu button 352 is provided to display the setting menu such as shooting parameters and operation modes of the digital camera 100, and to display the status of the digital camera 100. The menu includes selectable items or items whose values are variable.

A delete button 351 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 353 is pressed for selecting a mode or an item. When the enter button 353 is pressed, the system controller 50 in FIG. 2A sets the mode or item selected at this time. The display ON/OFF button 66 is used for selecting displaying or non-displaying of photograph information regarding the shot image, and for switching the image display unit 28 to be functioned as an electronic view finder.

A left button 354, a right button 355, an up button 356, and a down button 357 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

FIGS. 1C to 1G are views for explaining an imaging system (e.g., imaging system 150) for capturing spectral information according to example embodiments. These embodiments are shown merely for purposes of example, and other arrangements are possible. In that regard, as mentioned above, in some embodiments image sensor 14 may be constructed to capture high-resolution additional spectral data itself, and thus in some cases the additional hardware of imaging system 150 may not be necessary.

Figure 1C:
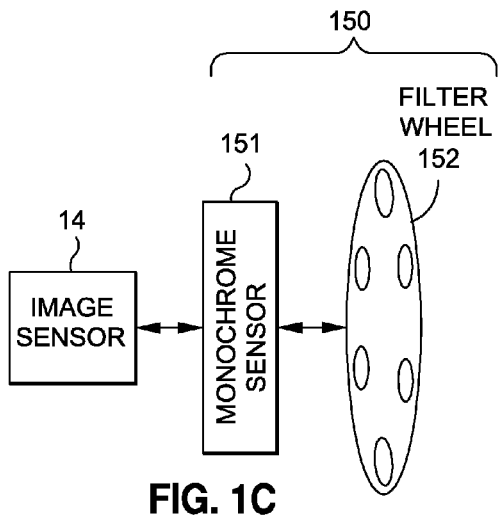
FIGS. 1C to 1G are views for explaining an imaging system according to example embodiments.
Figure 1D:
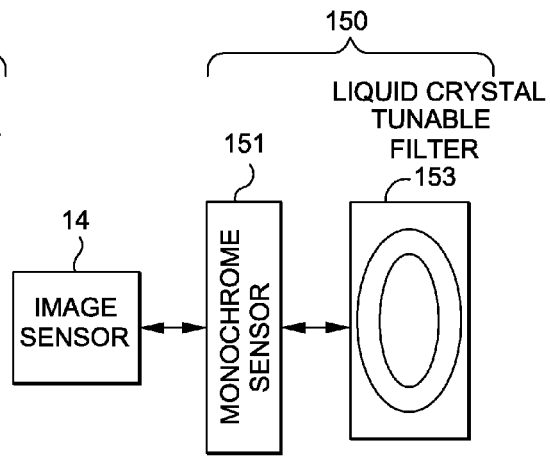

FIGS. 1C and 1D depict embodiments in which image sensor 14 is an RGB sensor combined with an additional imaging sensor. The additional imaging sensor is comprised of a monochrome sensor 151 and a set of narrow-band filters. The narrow-band filters, in turn, can be comprised of a filter wheel 152 (FIG. 1C) with filters with different spectral bands, or a liquid crystal tunable filter 153 (FIG. 1D). Either of these embodiments ordinarily provides relatively high spectral resolution and relatively high spatial resolution. However, due to cost and size of the system, such embodiments ordinarily are only appropriate for high-end imaging of static objects.

Figure 1E:
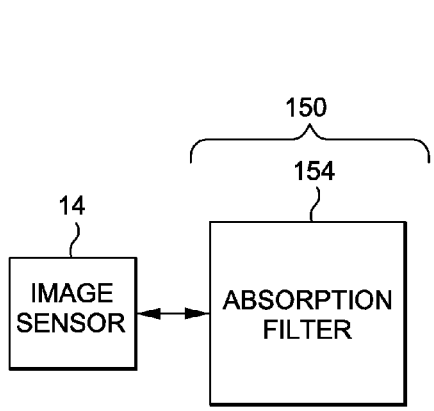

FIG. 1E depicts an embodiment in which image sensor 14 is an RGB sensor combined with an absorption filter 154, for example as shown in U.S. Pat. No. 7,554,586, "System and method for scene image acquisition and spectral estimation using a wide-band multi-channel image capture", the contents of which are incorporated by reference herein. The captured RGB from image sensor 14 without an external filter provides the traditional image capture. Meanwhile, a spectral reflectance estimation process is performed to get higher spectral resolution data from lower spectral resolution captured data provided by the combination of unfiltered images from image sensor 14, and filtered RGB images from absorption filter 154. The external absorption filter 154 changes the overall sensitivities of the original RGB sensor providing three additional channels. This embodiment provides relatively high spatial resolution and is relatively usable for dynamic scenes if the filter 154 is fast-switching, and there is ordinarily no need for a secondary sensor as in the embodiments of FIGS. 1C and 1D. On the other hand, the embodiment of FIG. 1E tends to have relatively low spectral resolution.

Figure 1F:
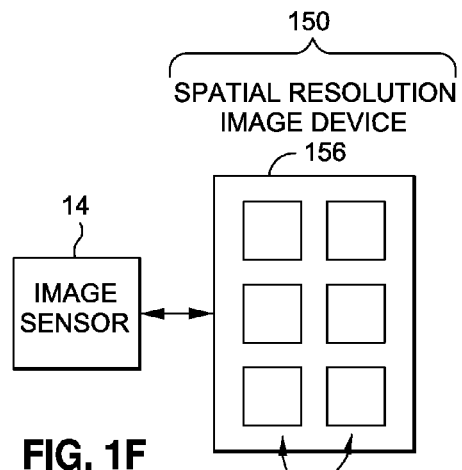

FIG. 1F depicts an embodiment in which image sensor 14 is an RGB sensor combined with an additional high-spectral resolution but low-spatial resolution imaging device 156, for example a device which includes an array of spectral sensing devices 155 with high-spectral resolution, such as described in U.S. Publications No. 2010/0045050, 2010/0046077, 2010/0053755 and 2010/0182598, the contents of which are incorporated by reference herein. Main RGB imaging sensor 14 provides the conventional photography capture, whereas a secondary sensor (array of high-spectral resolution sensors) 155 works as a low-spatial resolution but high-spectral resolution spectral measurement device. The arrangement of FIG. 1F provides high spectral resolution with relatively low cost, and can be applied to dynamic scenes. On the other hand, the secondary sensor (e.g., the array of spectral sensing devices) ordinarily has a low spatial resolution.

Figure 1G:
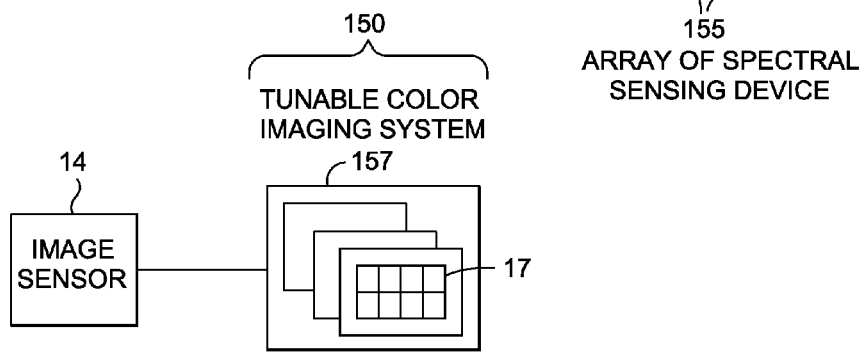

FIG. 1G depicts an example embodiment in which image sensor 14 is an RGB imaging sensor coupled with a color imaging system 157 with tunable spectral sensitivities. The tunable spectral sensitivities may be tunable in accordance with a capture parameter 17. This arrangement is described in detail in U.S. application Ser. No. 12/949,592, by Francisco Imai, entitled "Adaptive Spectral Imaging By Using An Imaging Assembly With Tunable Spectral Sensitivities", the contents of which are incorporated by reference herein.

As mentioned above, image sensor 14 itself may have high spectral resolution and capture additional multi-spectral data. Thus, additional hardware might not be necessary at all, although multiple captures might be needed. Regardless of the implementation, the spatial resolution of the captured image will be higher than the spectral resolution of the captured image.

Additionally, image sensor 14 itself could have tunable spectral sensitivities, as described in U.S. application Ser. No. 12/949,592. In such an embodiment, image sensor 14 is a multi-spectral image sensor which has a spectral response which is tunable in accordance with a capture parameter 17.

In that regard, any of the embodiments above ordinarily will provide enough spectral information to identify, or at least differentiate between, different materials in a scene. As mentioned, some embodiments may capture lower resolution spectral resolution than others, and thus have less accuracy in identifying materials. Nevertheless, even low spectral resolution information may allow for differentiation between distinct areas comprised of different materials.

Figure 2A:
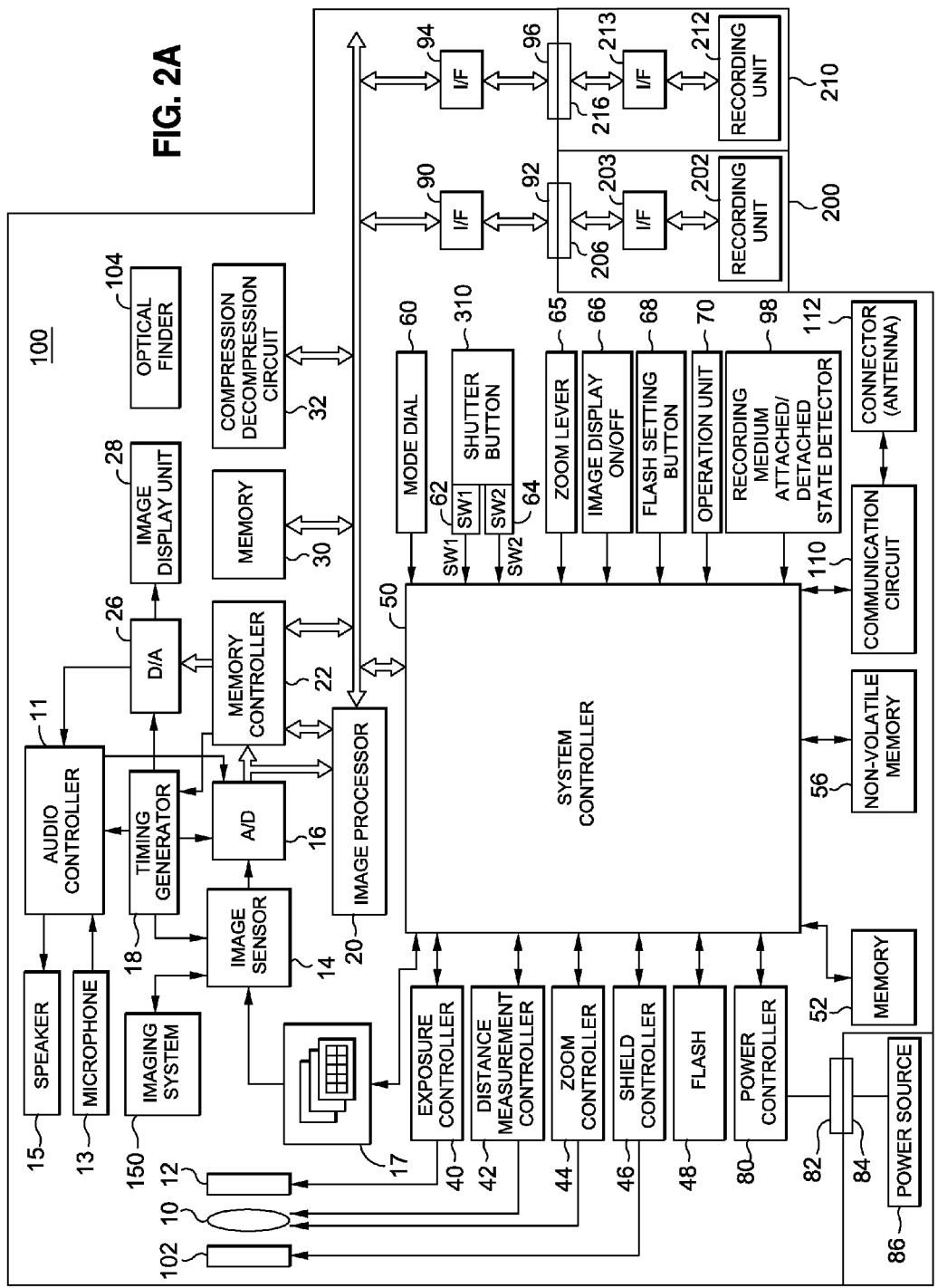
FIGS. 2A to 2C are detailed block diagrams for explaining the internal architecture of the image capture device shown in FIG. 1 according to example embodiments.

FIG. 2A is a block diagram showing an example of the arrangement of the multi-spectral digital camera 100 as an image capture device according to this embodiment. Referring to FIG. 2, reference numeral 10 denotes an imaging lens; 12, a shutter having an aperture function; and 14, an image sensor which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2A, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

In the embodiment shown in FIG. 2A, image sensor 14 is tunable in accordance with a capture parameter 17. The precise nature of the spectral responsivity of image sensor 14 is controlled via capture parameter 17. In this embodiment, capture parameter 17 may be comprised of multiple spatial masks, with one mask each for each channel of information output by image sensor 14. Each spatial mask comprises an array of control parameters corresponding to pixels or regions of pixels in image sensor 14. In this regard, image sensor 14 may be comprised of a transverse field detector (TFD) sensor mentioned hereinabove. The spatial masks may correspond to voltage biases applied to control electrodes of the TFD sensor. The spectral responsivity of each pixel, or each region of plural pixels, is thus tunable individually and independently of other pixels or regions of pixels.

In one example embodiment, image sensor 14 can gather high-resolution spectral data, and outputs, for example, five or more channels of color information, including a red-like channel, a green-yellow-like channel, a green-like channel, a blue-green-like channel, and a blue-like channel. In such an example, where image sensor 14 outputs five or more channels, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information.

In the embodiment shown in FIG. 2A, however, it can be assumed that image sensor 14 is a conventional RGB sensor which is combined with imaging system 150 in FIG. 2 to gather the additional spectral information.

Imaging system 150 is a camera system which is incorporated with the image sensor 14 in order to provide additional capabilities for capturing spectral information. In that regard, several arrangements are possible for imaging system 150, including a monochrome imaging sensor combined with a filter wheel or a liquid crystal tunable filter, an absorption filter, an additional array of spectral sensing devices, or a color imaging system with tunable spectral sensitivities, as described above with respect to FIGS. 1C to 1G.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in nonvolatile memory 56 and/or the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
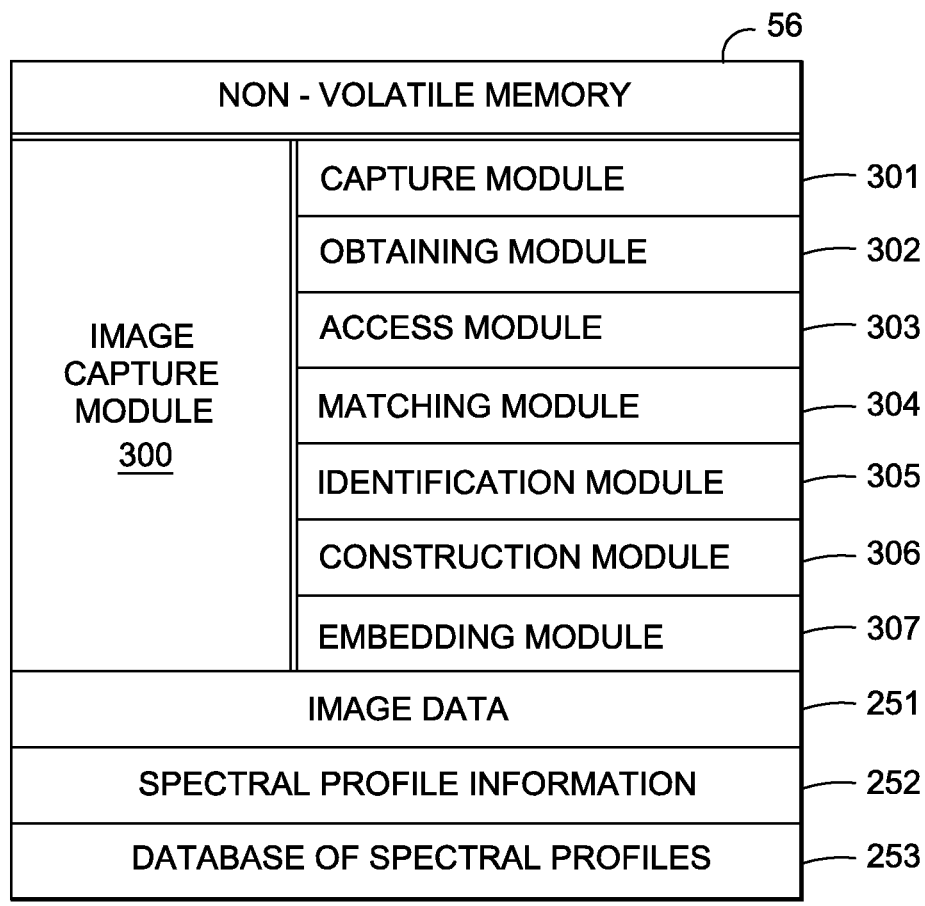

In particular, as shown in FIG. 2B, non-volatile memory 56 is an example of a non-transitory computer-readable memory medium, having retrievably stored thereon image capture module 300 as described herein. According to this example embodiment, the image capture module 300 includes at least a capture module 301 for capturing image data of a scene, a obtaining module 302 for obtaining spectral profile information for the scene, an access module 303 for accessing a database of plural spectral profiles each of which maps a material to a corresponding spectral profile reflected therefrom, a matching module 304 for matching the spectral profile information for the scene against the database, an identification module 305 for identifying materials for objects in the scene by using matches between the spectral profile information for the scene against the database, a construction module 306 for constructing metadata which identifies materials for objects in the scene, and an embedding module 307 for embedding the metadata with the image data for the scene. These modules will be discussed in more detail below with respect to FIG. 3A.

Additionally, as shown in FIG. 2B, non-volatile memory 56 also includes image data 251, which includes image data from a scene. The image data for the scene may also be embedded with metadata which identifies materials for objects in the scene. Non-volatile memory 56 further stores spectral profile information 252. Spectral profile information 252 includes information indicating the spectral signature of objects in the region of interest, and the respective profile information is matched against a database of predetermined spectral profiles 253 in order to identify the materials of the object. Each of these elements will be described more fully below.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in non-volatile memory 56, and/or in recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in non-volatile memory 56, and/or in recording medium 200 or 210.

The digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of image display unit 28, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

FIG. 3A is a view for explaining an image capture module according to one example embodiment. As previously discussed with respect to FIG. 2B, image capture module 300 comprises computer-executable process steps stored on a non-transitory computer-readable storage medium, such as non-volatile memory 56. More or less modules may be used, and other architectures are possible.

As shown in FIG. 3A, image capture module 300 at least a capture module 301 for capturing image data of a scene. To that end, capture module 301 communicates with image sensor 14 and/or imaging system 150, which gathers image data and associated spectral information from a scene. Capture module 301 transmits the image data for the scene and the spectral information to obtaining module 302, for obtaining spectral profile information for the scene (e.g., from image sensor 14 if image sensor 14 can capture such data, or from imaging system 150 if image sensor 14 is a conventional RGB sensor). Access module 303 accesses a database of plural spectral profiles, each of which maps a material to a corresponding spectral profile reflected therefrom. In that regard, the database of plural spectral profiles may be stored in non-volatile memory 56, shown in FIG. 2B as database of spectral profiles 253.

Matching module 304 matches the spectral profile information for the scene calculated by obtaining module 302 against the database of spectral profiles (e.g., database of spectral profiles 253), and transmits this information to identification module 305. Identification module 305 identifies materials for objects in the scene by using matches between the spectral profile information for the scene against the database. Once the materials corresponding to the spectral profile information are identified, construction module 306 constructs metadata (e.g., object metadata) which identifies materials for objects in the scene. Embedding module 307 embeds the metadata with the image data for the scene. The resultant embedded image data may be stored with other image data, for example as image data 251 in non-volatile memory 56 shown in FIG. 2B.

Figure 4A:
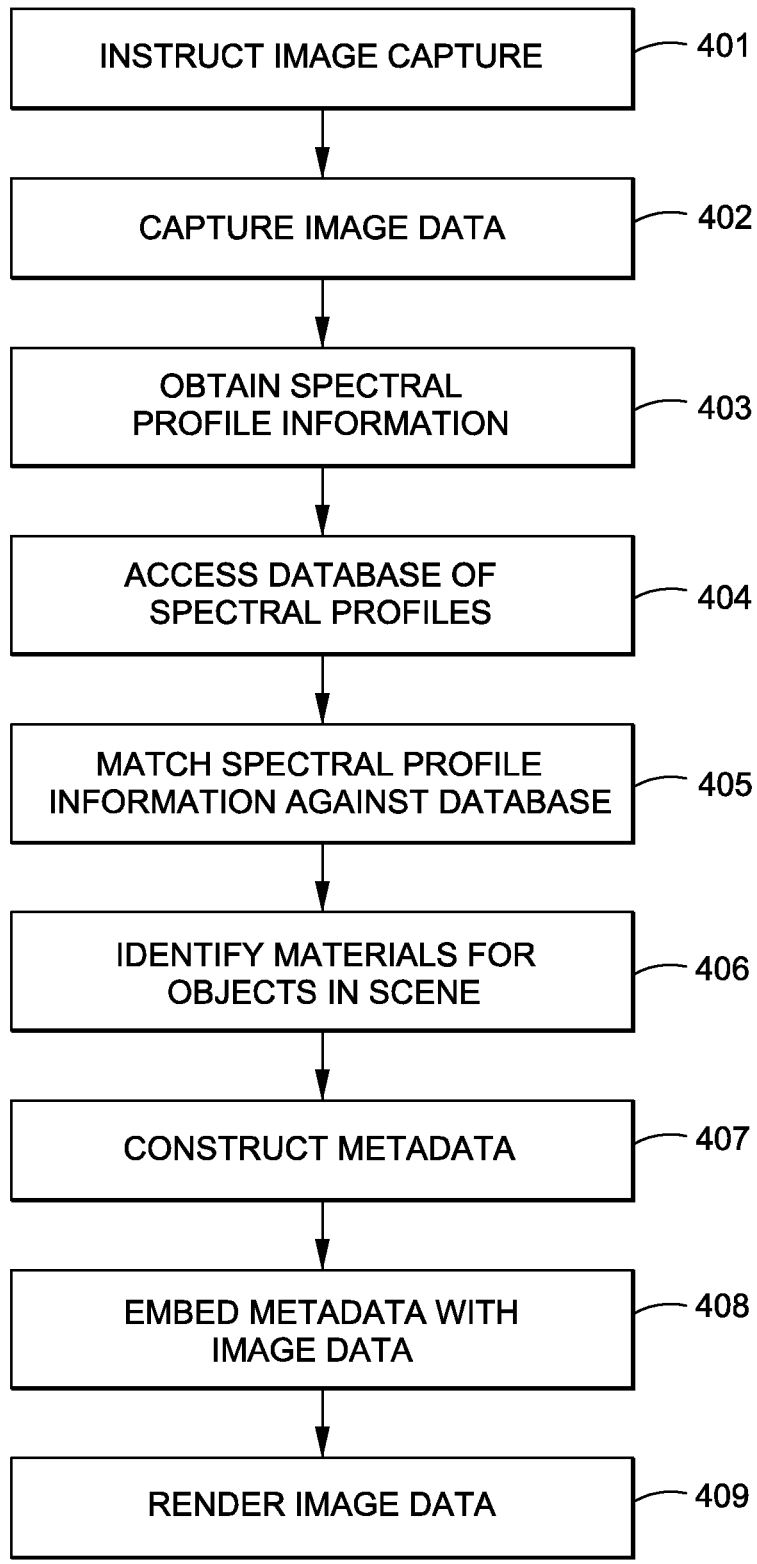
FIGS. 4A and 4B are flow diagrams for explaining processing in the image capture device shown in FIG. 1 according to example embodiments.

FIG. 4A is a flow diagram for explaining processing in the image capture device shown in FIG. 1 according to an example embodiment.

Briefly, in FIG. 4A, image data of a scene is captured. Spectral profile information is obtained for the scene. A database of plural spectral profiles is accessed, each of which maps a material to a corresponding spectral profile reflected therefrom. The spectral profile information for the scene is matched against the database, and materials for objects in the scene are identified by using matches between the spectral profile information for the scene against the database. Metadata which identifies materials for objects in the scene is constructed, and the metadata is embedded with the image data for the scene.

In particular, in step 401, a user instructs image capture, for example by full-stroke of the shutter button 310.

In step 402, the image capture device captures image data. In particular, upon instruction of image capture, light beam (light beam incident upon the angle of view of the lens) from an object in a scene that goes through the optical system (image sensing lens) 10 passes through an opening of the shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data).

In addition, spectral information is captured along with the raw image data, by image sensor 14 (if image sensor 14 is capable of capturing sufficient spectral data on its own, the spectral profile information for the scene is calculated from the captured image data of the scene) or by a combination of image sensor 14 and imaging system 150 (if image sensor 14 is not capable of capturing sufficient spectral data on its own). Example embodiments for capturing the spectral information are described above with respect to FIGS. 1C to 1G.

The spectral information may include, for example, five or more channels of color information, including a red-like channel, a green-yellow-like channel, a green-like channel, a blue-green-like channel, and a blue-like channel. The image data may be comprised of tri-stimulus device independent image data, e.g., XYZ image data.

In step 403, spectral profile information is obtained for the scene. The spectral profile information may be obtained from spectral data from image sensor 14 (if capable of capturing sufficient spectral data on its own) or a combination of image sensor 14 and imaging system 150 (if image sensor 14 is not capable of capturing sufficient spectral data on its own). For example, in an example embodiment in which each pixel has five channels, each pixel is integrated to produce five digital signals, one signal for each channel. Each channel is tuned to a spectral band within the visible spectrum. Therefore, the digital signal for each channel corresponds to a respective spectral reflectance curve within the visible spectrum.

Thus, spectral data gathered by imaging system 150 (or image sensor 14, if acting alone) is converted into a spectral reflectance curve, generally in the range from 400 to 700 nm of visible light. In that regard, spectral data may have up to 61 (with sampling rate of 5 nm) or more separate values. Comparing all of these values can be relatively inefficient. Accordingly, since spectral reflectance curves are generally smooth, it is ordinarily possible to use less values (i.e., less than the 61 discrete values), and eigenvectors can be used to reduce the required processing.

By assuming the relative smoothness of most of spectral reflectance curves it is possible to reduce the number of components of spectral data to six eigenvectors by performing eigenvector analysis. A transformation from the six capture signals to the coefficients of eigenvectors can be produced by a training set of captured images of objects with known representative spectral reflectances. Once the image is captured, the transformation is used to calculate the coefficients of the eigenvectors for each pixel of the image.

Specifically, eigenvectors and their coefficients represent the spectral data. The pre-calculated eigenvectors are used to decompose the captured spectral curves into coefficients, which can then be compared with coefficients in the database. The pre-calculated eigenvectors can be generated before image capture from common captured spectral reflectances, such as skin, clothes, hair and the like. Alternatively, eigenvectors could be pre-calculated for every possible reflectance, although this approach might require significant resources.

In one approach, the spectral reflectance of a collection of objects $R_{\lambda\_collection}$ is statistically analyzed. Eigenvector analysis is performed and 6 eigenvectors $e_i$ (where i=1 to 6) are pre-calculated. Any reflectance $R_{\lambda\_j}$ (where j=1 to m, where m is the number of objects in the collection) in the collection of objects could be reconstructed by combining the eigenvectors $e_j$.

Meanwhile, the estimation of the spectral reflectance for a captured object j is given by $R_{\lambda\_j\_estimation}=\Sigma a_i * e_i$ where $a_i$ are the coefficients of the eigenvectors for object j. The coefficients of the eigenvectors (represented here by a vector $A_j$ whose dimensions are i by 1) can be estimated from captured digital signals $D_j$ of object j by a pre-calculated transformation T from captured digital signals to eigenvectors: $Aj=T*D_j$. Accordingly, it is possible to obtain the coefficients of the eigenvectors from the captured spectral reflectance curves, which can then be compared with coefficients of eigenvectors from the database of plural spectral profiles to see if there is a match.

In some example embodiments such as that shown in FIG. 1F, due to the high number of components (e.g., R, G, B, and others) of the spectral information, it is difficult to deal with spectral data as signatures for objects. One possibility to deal with the burden of the high number of components is by relating coefficients of eigenvectors Aj associated to a particular object j.

In such a configuration, the measured spectra can be decomposed by the pre-calculated eigenvectors $e_i$ as follows: $Aj=R_{\lambda\_j}*pinv(e_i)$, where pinv is the pseudo-inverse operation.

A concrete example of calculating spectral profile information from the captured image data for the scene will now be briefly described with respect to FIGS. 6 to 11.

Figure 6:
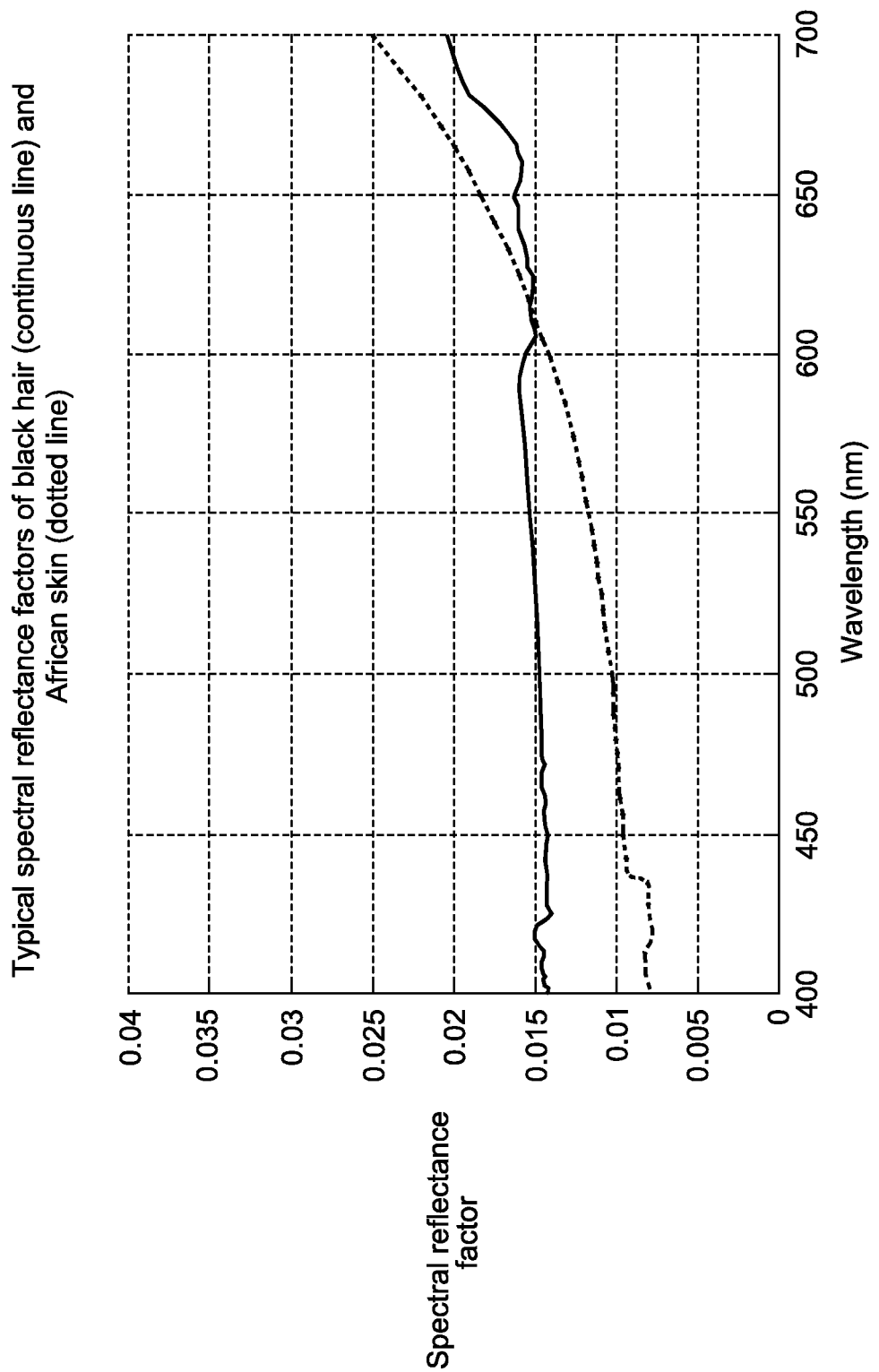
FIG. 6 is a view for explaining spectral reflectance factors according to an example embodiment.

In this example, assume a model of African origin whose face skin has a spectral reflectance R_skin and who has black hair with spectral reflectance R_hair. The typical spectral reflectance curves are shown in FIG. 6. It is clear from FIG. 6 that hair and skin have very distinct spectral reflectance properties.

Figure 7:
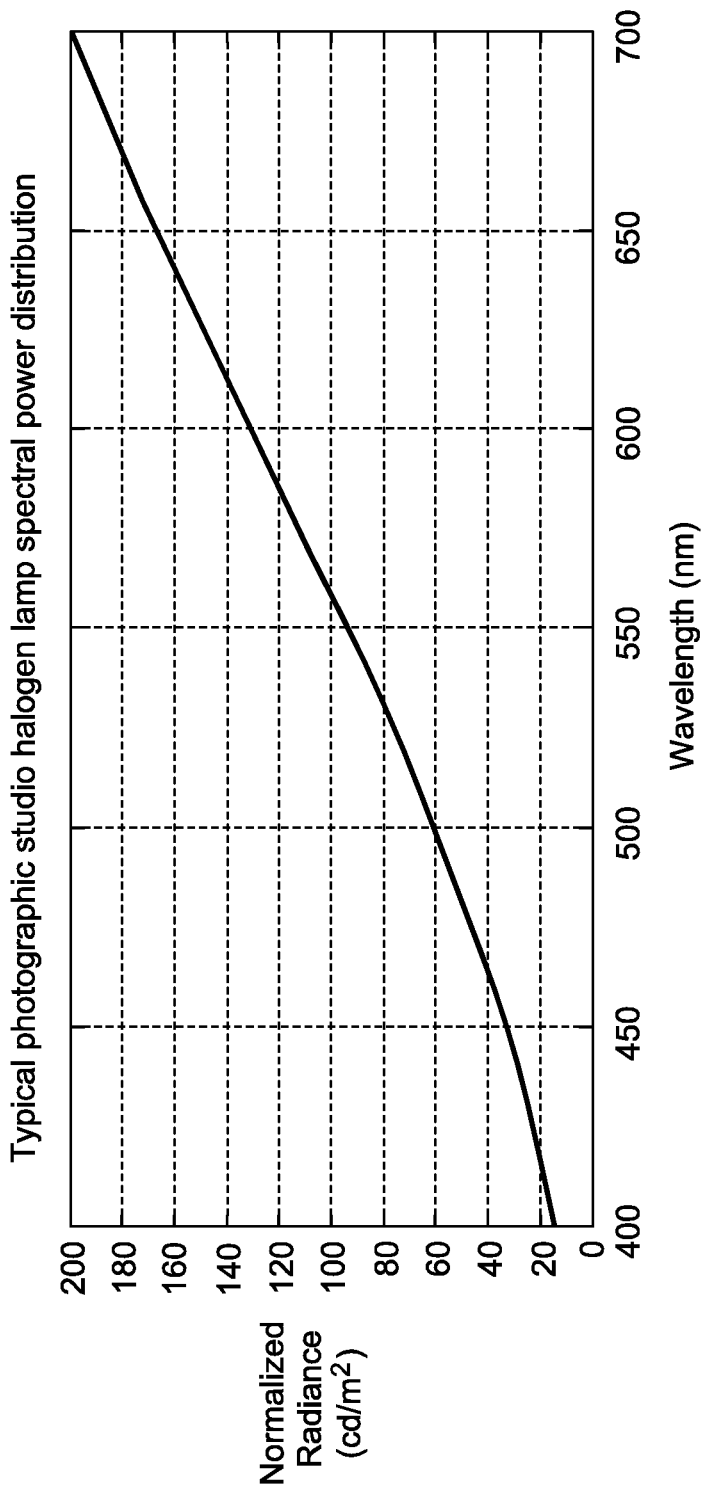
FIG. 7 is a view for explaining a spectral power distribution according to one example embodiment.
Figure 8:
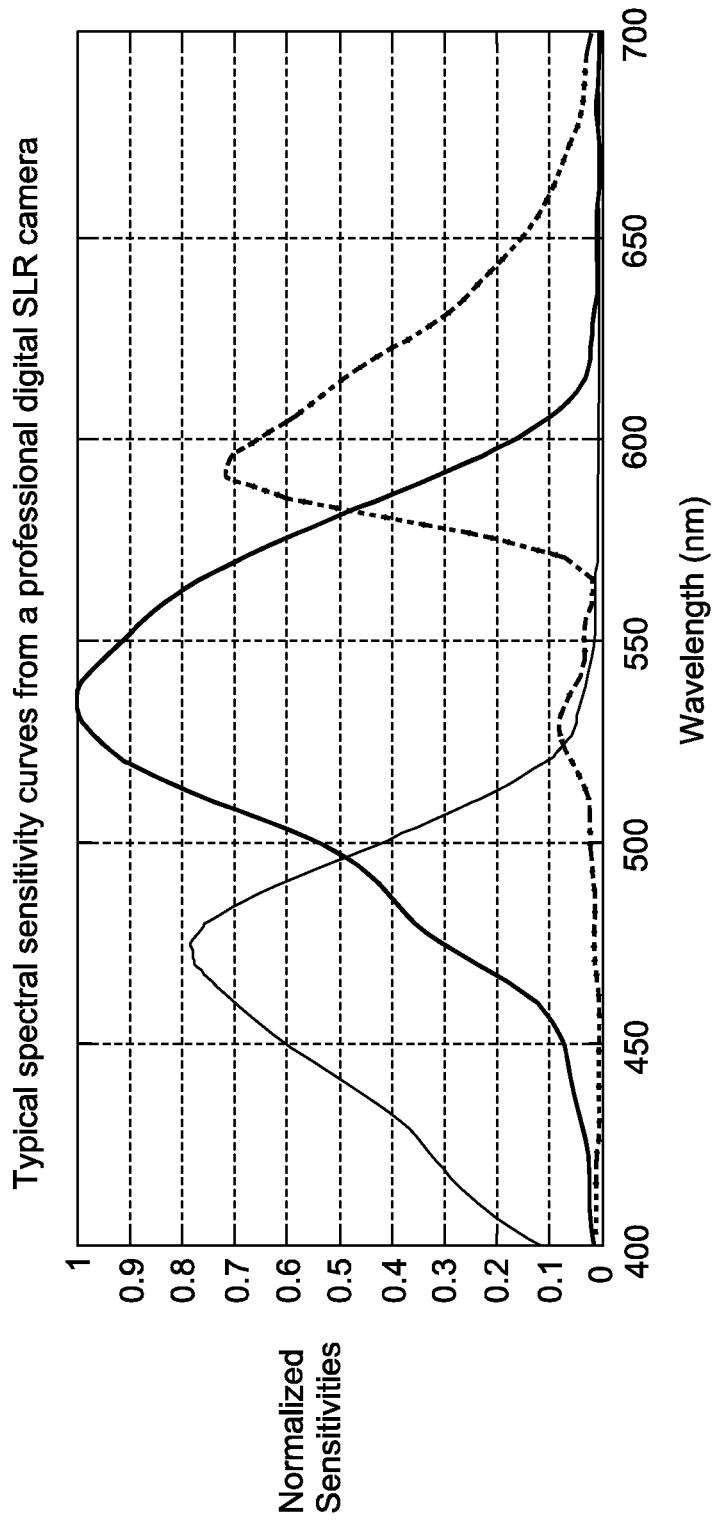
FIG. 8 is a view for explaining spectral sensitivity curves according to an example embodiment.

First, assume the model is imaged under typical photographic studio halogen lamps (whose spectral power distribution is shown in FIG. 7) and the model pictures are taken by a conventional professional digital SLR whose typical red-green-blue spectral sensitivities are shown in FIG. 8. When the digital images are captured, they include average values of Red_hair=24, Green_hair=14 and Blue_hair=7 for hair and average values of Red_skin=24, Green_skin=11 and Blue_skin=5 for skin. The camera values for dark skin and black hair are extremely similar, making them somewhat undistinguishable.

On the other hand, an imaging system that has a secondary spectral measurement sensor (e.g., any of FIGS. 1C to 1G) or an image sensor 14 with high spectral resolution captures spectral reflectance values for multiple regions of the image including hair and skin, respectively R_hair and R_skin. These measurements correspond to what is depicted in FIG. 6.

When the coefficient of eigenvectors are calculated for the captured black hair data it gives the following values are produced: A_hair=[0.006, −0.011, −0.001, −0.007, 0.017, 0.118], while the values for dark skin are given by A_skin= [0.0002, −0.029, −0.027, −0.035, −0.043, 0.429]. In this case, the spectral signatures given by the coefficients of eigenvectors are distinct between dark skin and black hair. These eigenvectors are compared with a database of plural spectral profiles such as database of spectral profiles 253 to identify materials for objects in the scene, as described more fully below with respect to steps 404 to 406.

Returning to FIG. 4A, in step 404, a database of plural spectral profiles is accessed. The database of plural spectral profiles may be stored in non-volatile memory 56, as shown by database of spectral profiles 253 in FIG. 2B. In another embodiment, the database of plural spectral profiles could be stored remotely in a server, provided that such server can be accessed from image capture device 100, i.e., as long as image capture device 100 has remote data access capabilities. Each of the plural spectral profiles maps a material to a corresponding spectral profile reflected therefrom.

Figure 9:
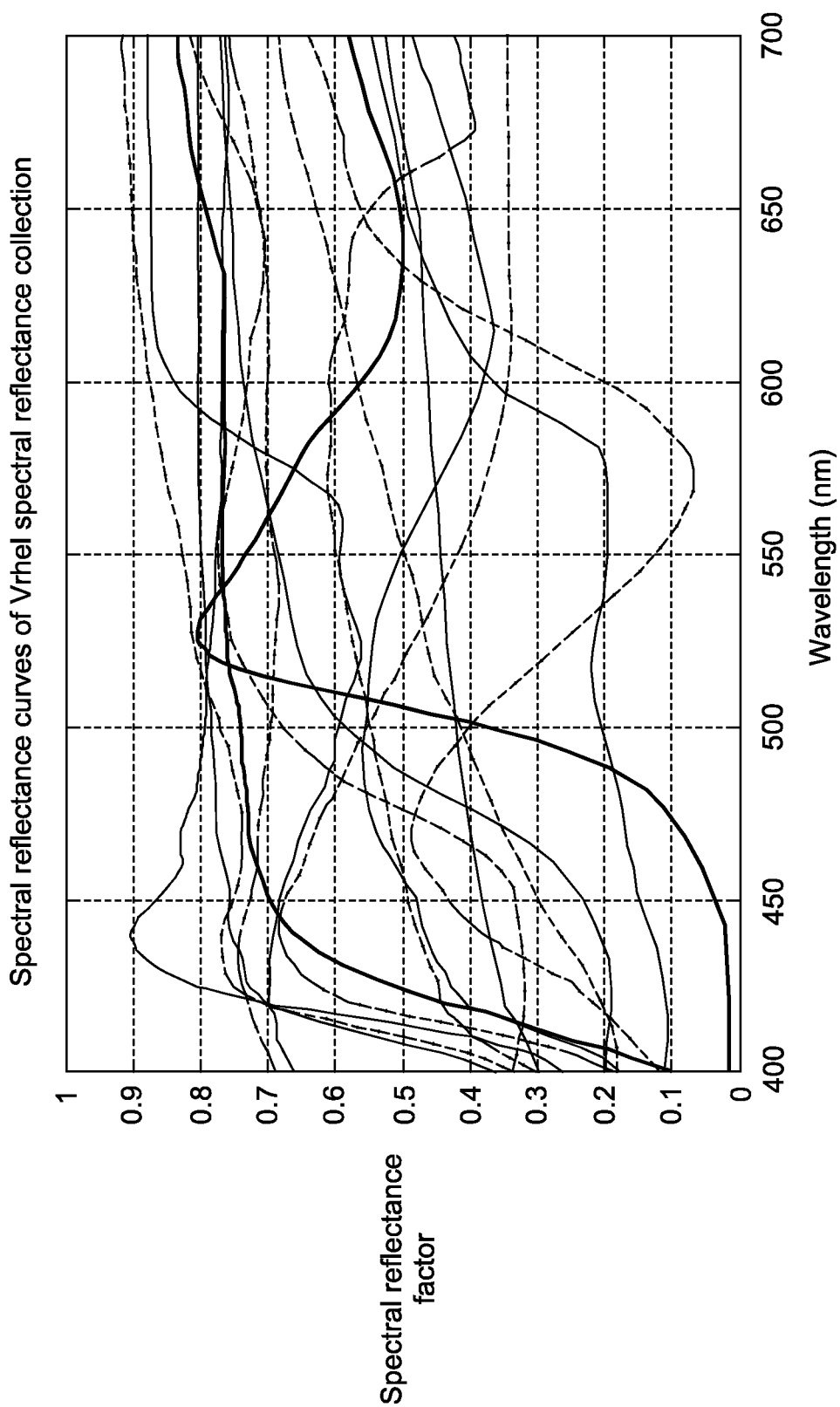
FIG. 9 is a view for explaining a database of plural spectral profiles according to an example embodiment.

FIG. 9 depicts an example of such a database. More specifically, FIG. 9 depicts a spectral database (such as the Vrhel database: Vrhel, M. J., R. Gershon, and L. S. Iwan, Measurement and analysis of object reflectance spectra, Color Res. and Appl., 19, 4-9, 1994, the contents of which are incorporated by reference herein. This database is comprised by spectral measurement of 170 objects. In that regard, for purposes of conciseness, the full database is not shown in FIG. 9. The database is one example of a pre-loaded set of spectral profiles in the form of computed eigenvectors and a look-up table (LUT) with typical spectral signatures (coefficients of eigenvectors) of most commonly imaged objects, such as skin, hair, vegetation, sky, etc.

Figure 10:
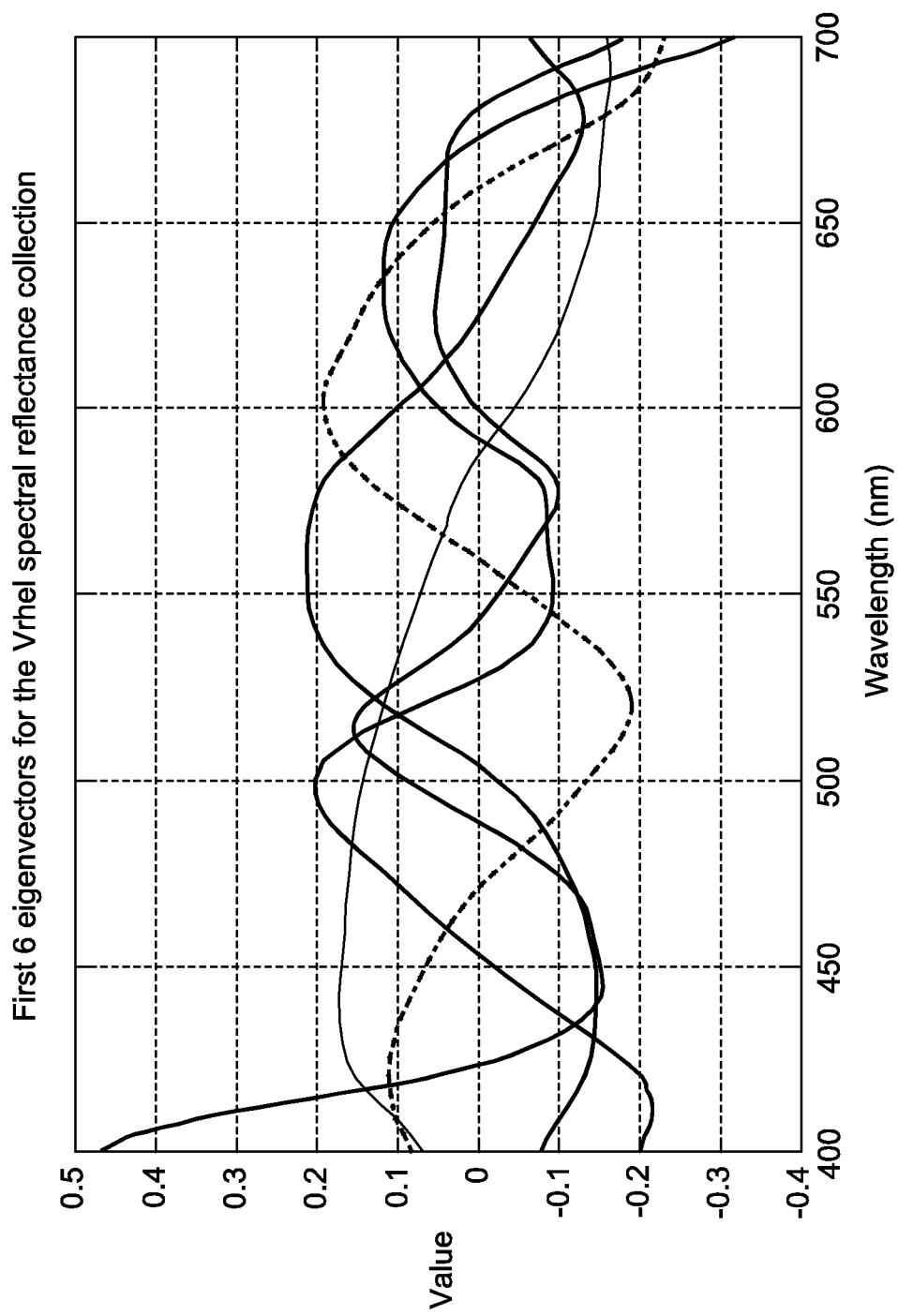
FIG. 10 is a view for explaining eigenvectors of the database of FIG. 9 according to an example embodiment.

Eigenvector analysis is performed for this collection of spectral reflectances, and the first 5 eigenvectors are shown in FIG. 10.

In step 405, the spectral profile information for the scene is matched against the database.

In particular, the coefficients of eigenvectors calculated in step 403 for the captured black hair data A_hair=[0.006, −0.011, −0.001, −0.007, 0.017, 0.118] and the dark skin data A_skin=[0.0002, −0.029, −0.027, −0.035, −0.043, 0.429] are compared with the plural profiles of spectral signatures accessed in step 404 to see if there are matches with spectral signatures of pre-identified objects in the database. If there are matches, the respective spectral signatures are then used to segment areas of the image with different spectral properties.

In that regard, the spectral profiles may be comprised of a relatively low number of spectral components. In particular, it may be unnecessary and impractical to attempt to specifically identify the exact material for each object in the scene. For example, outside of a specific setting in which all potential materials are known, it may not be possible to specifically identify an exact material, as this would require an enormous database of plural spectral profiles for all possible materials.

Nevertheless, even spectral profiles comprised of a relatively low number of spectral components can be used to differentiate between distinct areas made up of different materials, so that an artist or photographer can easily locate these materials for post-capture rendering. Specifically, automatic differentiation of different materials automatically provides the location or regions which include the different materials, which can then be accessed by an artist or photographer for post-capture rendering. Thus, the artist or photographer has the additional metadata identifying materials in the scene as a resource for rendering the scene.

In step 406, materials for objects in the scene are identified, using matches between the spectral profile information for the scene against the database. For example, if the coefficients of an object match (or are within a given similarity range as) the coefficients of a curve in the database, the material corresponding to the matching curve in the database is assigned to the relevant spectral profile information. This can be done, for example, by employing correlation analysis between the spectral profile and the database.

In step 407, metadata which identifies materials for objects in the scene is constructed. Using the metadata, it is possible to determine a location of one or more objects in the scene comprised of a particular identified material. The metadata can be constructed as shown in table 1202 in FIG. 12. Typical image metadata may include description metadata, file metadata, origin metadata, camera metadata, advanced photo metadata and image metadata. Description metadata may contain data such as title, subject, rating, tags and comments of the image. File metadata may contain data such as file name, item type (e.g. jpeg), folder path, data created, data modified, size and owner name. Origin metadata may contain information such authors, data taken, program name, data acquired and copyright information. Camera metadata could contain information such as camera maker, camera model, f-stop, exposure time, ISO speed, exposure bias, focal length, maximum aperture, metering mode, subject distance, flash mode, flash energy and 35 mm focal length. Advanced photo metadata could contain information such as lens maker, lens model, camera serial number, contrast, brightness, light source, exposure program, saturation, sharpness, white balance, photometric interpretation, digital zoom and EXIF version. Image metadata could include data such as image ID, dimensions, width, height, horizontal resolution, vertical resolution, bit depth, compression, resolution unit, color representation and compressed bits/pixel. Obviously, metadata is not standardized, and it could contain more information such as GPS coordinates, information of depth map, light field and aperture information. One example of material metadata could be composed of eigenvectors (or an index to a set of eigenvectors) that are pre-calculated and a list of materials with corresponding coordinates that encompass the area of the material and the coefficients of the eigenvectors that is the spectral signature of the material. For example, in the case of Material 1 in the example of FIG. 12, it corresponds to the area delimited by coordinates (x1$l$,y1$d$), (x1$l$, y1$u$), (x1$r$,y1$d$) and (x1$r$,y1$u$) and its coefficients are given by the vector A1. In this example, only 4 rectangular coordinates are used for delimitation, but an arbitrary number of points delimiting the region of the material in the image could be used to represent various types of shapes.

In step 408, the metadata is embedded with the image data for the scene. For example, the metadata can be embedded as additional data for each pixel in the scene. This method may be useful in a wide assortment of situations, as the pixel data can be compressed and offloaded to an application (or elsewhere) for processing. Alternatively, the metadata can be embedded by constructing an array for each respective material corresponding to pixels in the image, and indicating pixels of that material with values in the array. This latter method may be more efficient in scenes with a relatively small number of materials. In that regard, the metadata can be constructed as a spatial mask, and this spatial mask can be used as a metadata that is superimposed over the captured RGB image.

In step 409, the image data for the scene is rendered by using the metadata that identifies the material for objects in the scene. In that regard, image data having similar tri-stimulus values can rendered differently in dependence on the metadata. For example, using the example above, an artist could use the information indicating the respective locations of the hair and skin to adjust shadow detail or other effects for the hair and skin appropriately (and separately). In one example, management of image data having similar tri-stimulus values is directed differently in an output-referred color space in dependence on the metadata. For example, a photographer could use the located materials to separate an image into separate layers, which could then be adjusted independently, e.g., in Adobe Photoshop™. In one practical example, cosmetics with different spectral signatures can be respectively applied to different people in a scene, and the metadata can be used to identify a person in the scene using the spectral signature of a cosmetic applied to that person.

Figure 2C:
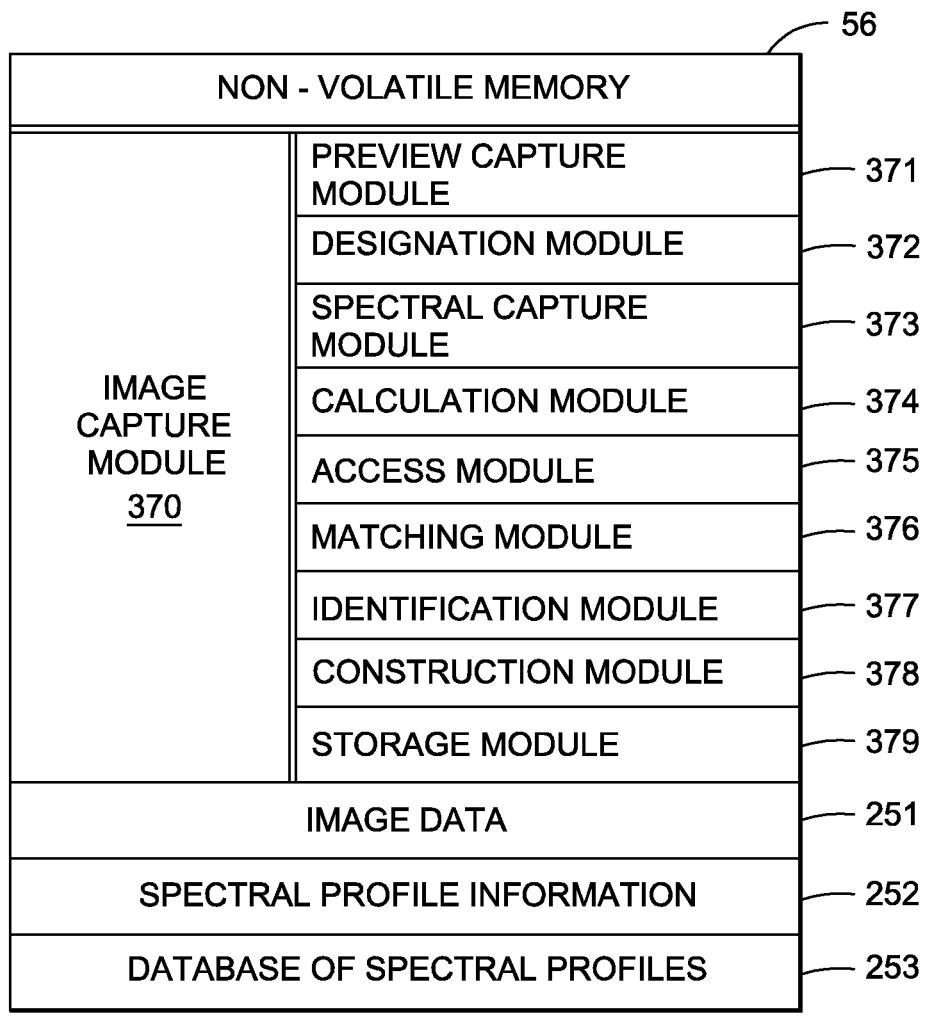

In another example embodiment shown in FIG. 2C, non-volatile memory 56 is an example of a non-transitory computer-readable memory medium, having retrievably stored thereon image capture module 370 as described herein. According to this example embodiment, the image capture module 370 includes at least a preview capture module 371 for capturing preview image data of a scene, a designation module 372 for accepting a designation of a region of interest in the preview image data, a spectral capture module 373 for capturing spectral image data of the scene, a calculation module 374 for calculating spectral profile information for the region of interest by using the captured spectral image data for the scene, an access module 375 for accessing a database of plural spectral profiles of which each profile maps a material to a corresponding spectral profile reflected therefrom, a matching module 376 for matching the spectral profile information for the region of interest against the database, an identification module 377 for identifying materials for objects in the region of interest by using matches between the spectral profile information for the region of interest against the database, a construction module 378 for constructing metadata which identifies materials for objects in the region of interest and which identifies location of the region of interest relative to the scene, and a storage module 379 for storing the metadata together with image data for the scene. These modules will be discussed in more detail below with respect to FIG. 3B.

Additionally, as shown in FIG. 2C, non-volatile memory 56 also includes image data 251, which includes image data from a scene. The image data for the scene may also be embedded with metadata which identifies materials for objects in the scene. Non-volatile memory 56 further stores spectral profile information 252. Spectral profile information 252 includes information indicating the spectral signature of objects in the region of interest, and the respective profile information is matched against a database of predetermined spectral profiles 253 in order to identify the materials of the object. Each of these elements will be described more fully below.

Figure 3B:
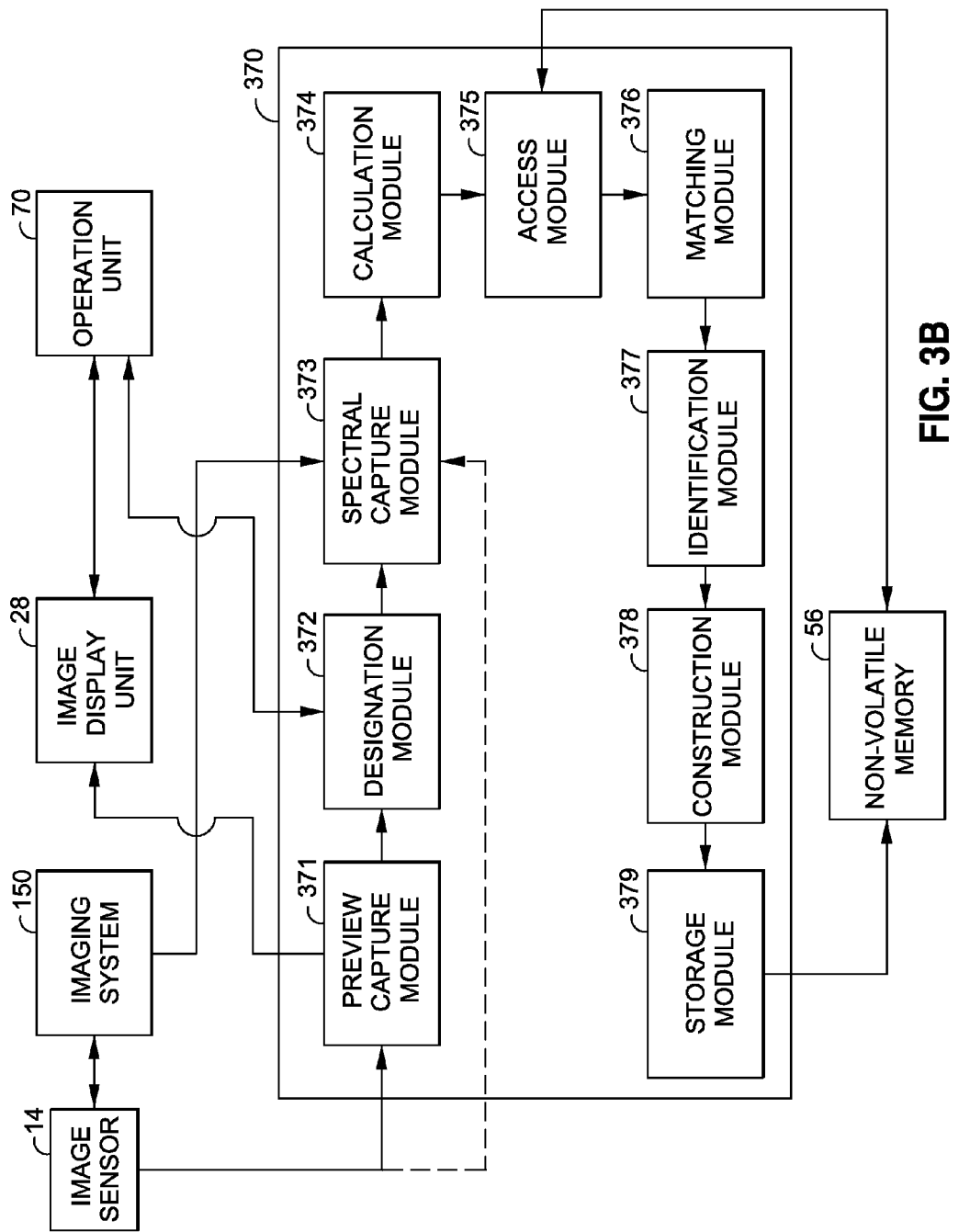

FIG. 3B is a view for explaining an image capture module according to this example embodiment. As previously discussed with respect to FIG. 2C, image capture module 370 comprises computer-executable process steps stored on a non-transitory computer-readable storage medium, such as non-volatile memory 56. More or less modules may be used, and other architectures are possible.

As shown in FIG. 3B, image capture module 370 includes at least a capture module 371 which captures preview image data of a scene. To that end, preview capture module communicates with image sensor 14. Additionally, preview capture module 371 communicates with image display unit 28, for example to transmit a preview image to be displayed on image display unit 28 so that a user can select a region of interest. Preview capture module 371 further communicates with designation module 372, for example to provide preview image data for designation of a region of interest.

Designation module 372 accepts a designation of a region of interest in the preview image data. Thus, designation module 372 is connected to preview capture module 371 to receive the captured preview image data. Designation module 372 is further connected to operation unit 70 to receive a designation of a region of interest from the user via the operation unit, such as a user's touch on a touch screen of operation unit 70. Designation module 372 also communicates with spectral capture module 373, to provide the designation of a region of interest for further processing.

Spectral capture module 373 captures spectral image data of the scene. To that end, spectral capture module 373 is connected to imaging system 150, and/or may be connected to image sensor 14. Thus, spectral capture module 373 may communicate with different hardware depending on how the spectral data is obtained (e.g., from image sensor 14 if image sensor 14 can capture such data alone, or from imaging system 150 if image sensor 14 is a conventional RGB sensor). Spectral capture module 373 further provides captured spectral image data to calculation module 374.

Calculation module 374 calculates spectral profile information for the region of interest by using the captured spectral image data for the scene. The calculated spectral profile information may be stored, for example, as spectral profile information 252 in non-volatile memory 56, as shown in FIG. 2C.

Access module 375 accesses a database of plural spectral profiles, for example database 253 stored in non-volatile memory 56, as shown in FIG. 2C. Each profile maps a material to a corresponding spectral profile reflected therefrom. Access module 375 further communicates with matching module 376, which matches the spectral profile information for the region of interest against the database. Identification module 377 identifies materials for objects in the region of interest by using matches between the spectral profile information for the region of interest against the database.

Construction module 378 constructs metadata which identifies materials for objects in the region of interest and which identifies location of the region of interest relative to the scene.

Storage module 379 stores the metadata together with image data for the scene, for example in non-volatile memory 56. In one example, storage module 379 embeds the metadata with the image data for the scene. The resultant embedded image data may be stored with other image data, for example as image data 251 in non-volatile memory 56 shown in FIG. 2C.

Figure 4B:
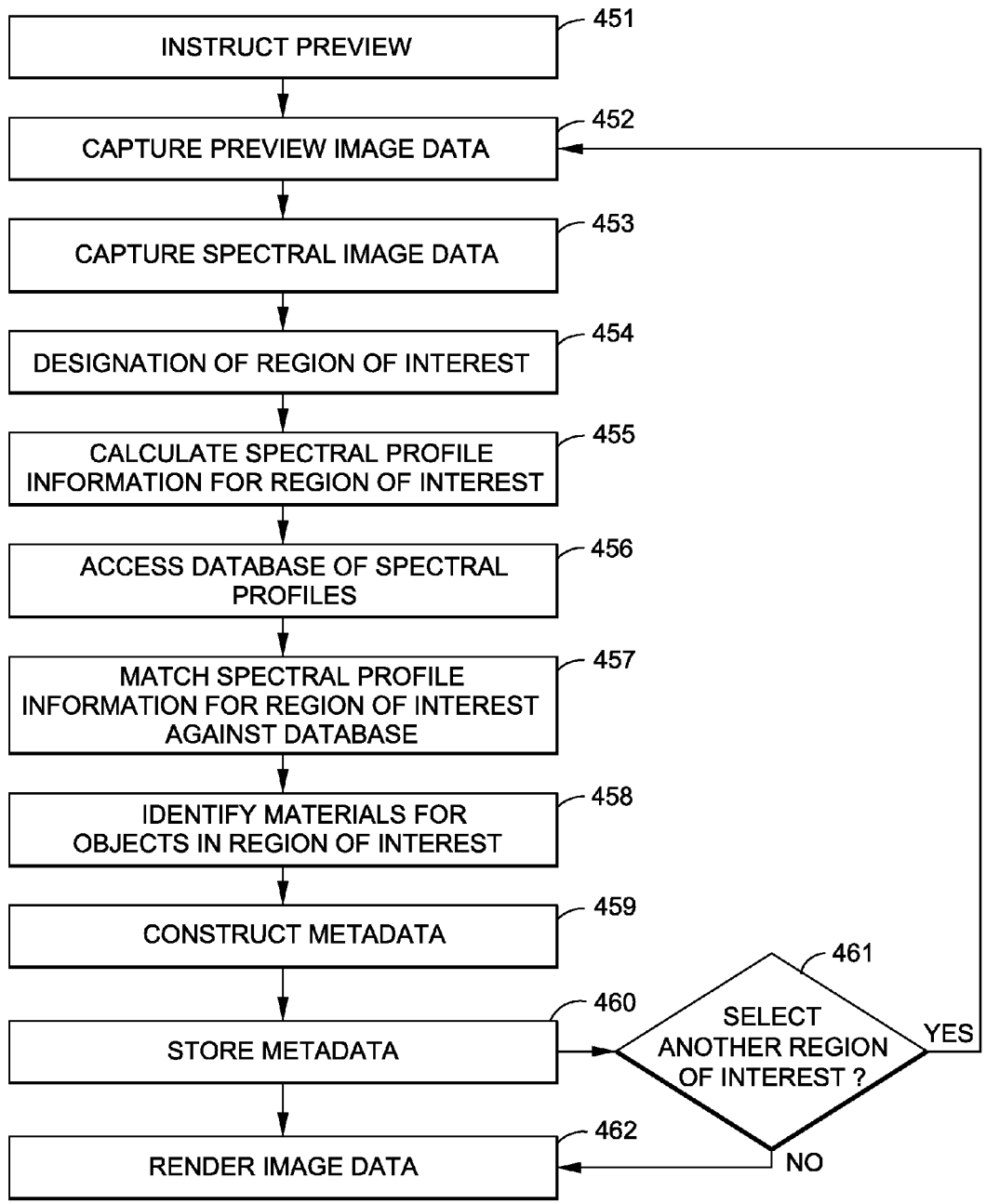

FIG. 4B is a flow diagram for explaining processing in the image capture device shown in FIG. 1 according to the example embodiment.

Briefly, as shown in FIG. 4B, preview image data of a scene is captured. A designation of a region of interest is accepted in the preview image data. Spectral image data of the scene is captured, and spectral profile information for the region of interest is calculated by using the captured spectral image data for the scene. A database of plural spectral profiles is accessed, of which each profile maps a material to a corresponding spectral profile reflected therefrom. The spectral profile information for the region of interest is matched against the database, and materials for objects in the region of interest are identified by using matches between the spectral profile information for the region of interest against the database. Metadata which identifies materials for objects in the region of interest and which identifies location of the region of interest relative to the scene is constructed. The metadata is stored together with image data for the scene.

In more detail, in step 451, a capture of preview image data of a scene is instructed. In that regard, the preview image data capture could be instructed by a user, or automatically by the image capture apparatus. For example, image capture apparatus 100 could be constructed to automatically capture preview image data in certain modes, such as a material identification mode for capturing spectral information as well as image data. In another example, image capture apparatus 100 could be constructed to automatically capture preview image data as a default setting.

In step 452, preview image data of the scene is captured. For example, image data of the scene currently sensed by image sensor 14 is captured and displayed on image display unit 28, thereby effecting a display of a preview image. In that regard, in order to "set" or hold a current scene as a preview image, image capture device 100 might provide a pause of the current image in response to, for example, a half-stroke of shutter button 310, or a tap on a touchscreen, such as that of image display unit 28.

In step 453, spectral image data of the scene is captured. In particular, spectral information is captured along with raw image data by image sensor 14 (if image sensor 14 is capable of capturing sufficient spectral data on its own), or by a combination of image sensor 14 and imaging system 150 (if image sensor 14 is not capable of capturing sufficient spectral data on its own). Embodiments for capturing the spectral information are described above with respect to FIGS. 1C to 1G. If image sensor 14 is capable of capturing sufficient spectral data, stored image data (e.g., image data 251) can be comprised of the captured spectral image data. In that regard, spectral data may be captured for the entire scene, even though spectral profile information may ultimately be calculated only for a region of interest.

In some instances, the captured spectral image data may be low-resolution image data having three (3) or less components, e.g., only a few channels such as RGB, or even, in some cases, merely black and white. On the other hand, the spectral information may also include a high number of spectral components including, for example, five or more channels of color information, including a red-like channel, a green-yellow-like channel, a green-like channel, a blue-green-like channel, and a blue-like channel. If image sensor 14 captures the spectral image data, the stored image data can be comprised of tri-stimulus device independent image data, e.g., XYZ image data derived from the captured spectral image data.

In step 454, a region of interest is designated in the captured preview image data.

Figure 5A:
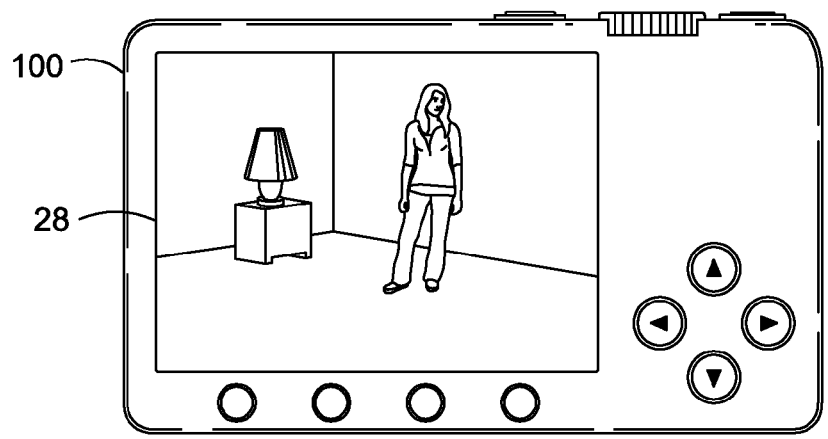
FIG. 5A is a view for explaining display of an image by the image capture device shown in FIG. 1 according to one example embodiment.

In that regard, FIG. 5A is a view for explaining designation of a region of interest with the image capture device shown in FIG. 1. In particular, a rear view of image capture apparatus 100 having image display unit 28 is provided in FIG. 5A. According to this example embodiment, a user interface which includes a preview image based on captured image data of a scene is displayed on the image display unit 28.

The user controlling the image capture device 100 views the preview image displayed on the image display unit 28 as shown in FIG. 5A, and decides a region of the scene in which to differentiate locations comprised of different materials.

In particular, an artist or photographer may only want to differentiate between materials in certain regions of a scene. For example, while an artist or photographer may be concerned with differentiating between similarly-colored areas in the foreground of a scene (e.g., making a distinction between a black velvet jacket over black leather pants), the artist may nonetheless be unconcerned about differentiating between objects or regions comprising the background of the scene. In such a case, calculating spectral profile information and identifying or differentiating between materials for the entire scene could waste memory space and processing resources. Accordingly, the present embodiment allows the user to narrow down the scene to one or more regions of interest for which to calculate spectral profile information.

Figure 5B:
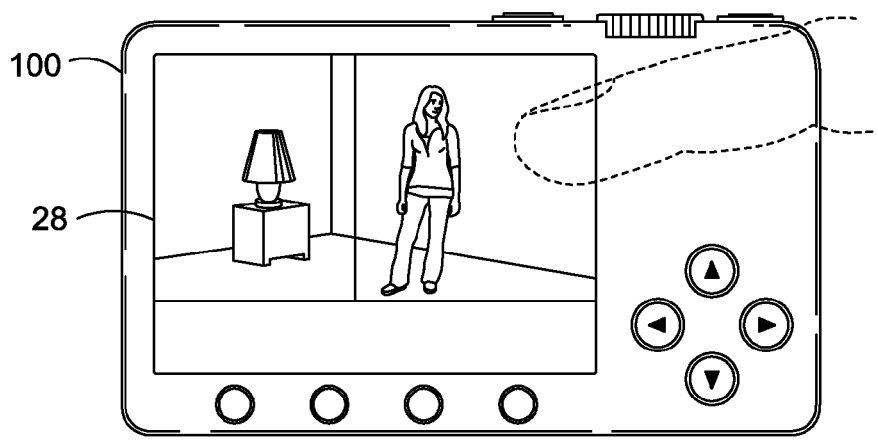
FIG. 5B is a view for explaining selection of a region of interest according to one example embodiment.

FIG. 5B is a view for explaining acceptance of a designation of a region of interest according to one example embodiment. As shown in FIG. 5B, the preview image displayed on the image display unit 28 depicts an image divided into a plurality of regions.

Multiple different methods of segmenting the image into regions are possible. In one example, RGB (or other color scheme) values are determined for each pixel in the preview image, and pixels having substantially the same RGB values (or within a certain range or tolerance) are determined to be included in the same ROI. Alternatively, the ROI can be actively determined. For example, when the user designates the ROI in the preview image, the image capture device can determine which pixels of the image which are included in the ROI. For example, a spatial filtering algorithm is executed to determine the edges of the ROI. Thus, the user "grabs" a region. Of course, any other suitable processes for dividing the image into regions can also be used. Additionally, the user may adjust the size of the regions relative to the image displayed.

In FIG. 5B, the preview image includes three regions. In one region of the preview image, a table and lamp are displayed. In another region, a person is displayed. In a third region, a floor area is displayed. As shown in FIG. 2B, the user designates the region including the person.

Figure 5C:
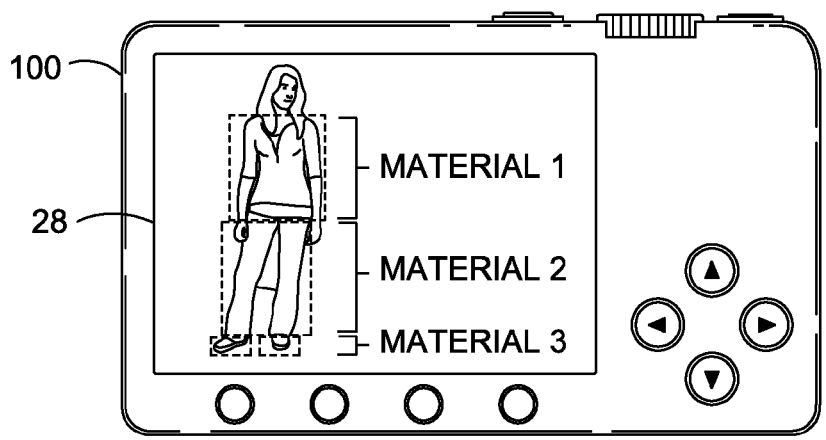
FIG. 5C is a view for explaining an output display for a selected region of interest according to one example embodiment.

Thus, as shown in FIG. 5C, the region including the person is displayed, along with identification of different materials comprising the person. The different materials of the region of interest can be identified and data of the identified materials can be embedded with metadata for the scene, as discussed more fully below.

The user interfaces depicted in FIGS. 5A to 5C are merely examples of user interfaces which can be displayed by the user interface according to this example embodiment. It should be understood that other types of suitable interfaces can also be displayed. In addition, other selection methods of a region of interest may be used, e.g., tapping with two fingers, a zoom method, voice commands, gaze tracking, and so on.

In step 455, spectral profile information for the region of interest is calculated by using the captured spectral image data for the scene. As mentioned above, spectral profile information may be obtained from mage sensor 14 (if capable of capturing sufficient spectral data on its own) or from a combination of image sensor 14 and imaging system 150 (if image sensor 14 is not capable of capturing sufficient spectral data on its own).

Spectral data gathered by imaging system 150 (or image sensor 14, if acting alone) is converted into a spectral reflectance curve, generally in the range from 400 to 700 nm of visible light. For example, in an example embodiment in which each pixel has five channels, each pixel is integrated to produce five digital signals, one signal for each channel. Each channel is tuned to a spectral band within the visible spectrum. Therefore, the digital signal for each channel corresponds to a respective spectral reflectance curve within the visible spectrum.

In that regard, spectral data may have up to 61 or more separate values. Comparing all of these values can be relatively inefficient. Accordingly, since spectral reflectance curves are generally smooth, it is ordinarily possible to use less values (i.e., less than the 61 discrete values), and eigenvectors can be used to reduce the required processing.

By assuming the relative smoothness of most of spectral reflectance curves it is possible to reduce the number of components of spectral data to six eigenvectors by performing eigenvector analysis. A transformation from the six capture signals to the coefficients of eigenvectors can be produced by a training set of captured images of objects with known representative spectral reflectances. Once the image is captured, the transformation is used to calculate the coefficients of the eigenvectors for each pixel of the image.

Specifically, eigenvectors and their coefficients represent the spectral data. The pre-calculated eigenvectors are used to decompose the captured spectral curves into coefficients, which can then be compared with coefficients in the database. The pre-calculated eigenvectors can be generated before image capture from common captured spectral reflectances, such as skin, clothes, hair and the like. Alternatively, eigenvectors could be pre-calculated for every possible reflectance, although this approach might require significant resources.

In one approach, the spectral reflectance of a collection of objects $R_{\lambda\_collection}$ is statistically analyzed. Eigenvector analysis is performed and 6 eigenvectors $e_i$ (where i=1 to 6) are pre-calculated. Any reflectance $R_{\lambda\_j}$ (where j=1 to m, where m is the number of objects in the collection) in the collection of objects could be reconstructed by combining the eigenvectors $e_j$.

Meanwhile, the estimation of the spectral reflectance for a captured object j is given by $R_{\lambda\_j\_estimation} = \Sigma a_i * e_i$ where $a_i$ are the coefficients of the eigenvectors for object j. The coefficients of the eigenvectors (represented here by a vector $A_j$ whose dimensions are i by 1) can be estimated from captured digital signals $D_i$ of object j by a pre-calculated transformation T from captured digital signals to eigenvectors: $Aj = T*D_j$. Accordingly, it is possible to obtain the coefficients of the eigenvectors from the captured spectral reflectance curves, which can then be compared with coefficients of eigenvectors from the database of plural spectral profiles to see if there is a match.

In some example embodiments such as that shown in FIG. 1F, due to high-number of components of spectral information, it is difficult to deal with spectral data as signatures for objects. One possibility to deal with this burden is by relating coefficients of eigenvectors Aj associated to a particular object j.

In such a configuration, the measured spectra can be decomposed by the pre-calculated eigenvectors $e_i$ as follows: $Aj=R_{\lambda\_j}*pinv(e_i)$, where pinv is the pseudo-inverse operation.

A concrete example of calculating spectral profile information from the captured image data for the scene will briefly be described with respect to FIGS. 6 to 11.

In this example, assume a model of African origin whose face skin has a spectral reflectance R_skin and who has black hair with spectral reflectance R_hair. The typical spectral reflectance curves are shown in FIG. 6. It is clear from FIG. 6 that hair and skin have very distinct spectral reflectance properties.

First, assume the model is imaged under typical photographic studio halogen lamps (whose spectral power distribution is shown in FIG. 7) and the model pictures are taken by a conventional professional digital SLR whose typical red-green-blue spectral sensitivities are shown in FIG. 8. When the digital images are captured, they include average values of Red_hair=24, Green_hair=14 and Blue_hair=7 for hair and average values of Red_skin=24, Green_skin=11 and Blue_skin=5 for skin. The camera values for dark skin and black hair are extremely similar, making them somewhat undistinguishable.

On the other hand, an imaging system that has a secondary spectral measurement sensor (e.g., any of FIGS. 1C to 1G) or an image sensor 14 with high spectral resolution captures spectral reflectance values for multiple regions of the image including hair and skin, respectively R_hair and R_skin. These measurements correspond to what is depicted in FIG. 6.

When the coefficient of eigenvectors are calculated for the captured black hair data it gives the following values are produced: A_hair=[0.006, −0.011, −0.001, −0.007, 0.017, 0.118], while the values for dark skin are given by A_skin=[0.0002, −0.029, −0.027, −0.035, −0.043, 0.429]. In this case, the spectral signatures given by the coefficients of eigenvectors are distinct between dark skin and black hair. These eigenvectors are compared with a database of plural spectral profiles such as database of spectral profiles 253 to identify materials for objects in the region of interest, as described more fully below. Additional details of the above processes can be found in U.S. application Ser. No. 13/871,826, filed Feb. 24, 2011, titled "Image Capture And Post-Capture Processing", by John Haikin, et. al, the contents of which are incorporated herein by reference.

Returning to FIG. 4B, in step 456, a database of plural spectral profiles is accessed. The database of plural spectral profiles may be stored in non-volatile memory 56, as shown by database of spectral profiles 253 in FIG. 2C. In another embodiment, the database of plural spectral profiles could be stored remotely in a server, provided that such server can be accessed from image capture apparatus 100, i.e., as long as image capture apparatus 100 has remote data access capabilities. Each of the plural spectral profiles maps a material to a corresponding spectral profile reflected therefrom.

FIG. 9 depicts an example of such a database. More specifically, FIG. 9 depicts a spectral database (such as the Vrhel database: Vrhel, M. J., R. Gershon, and L. S. Iwan, Measurement and analysis of object reflectance spectra, Color Res. and Appl., 19, 4-9, 1994, the contents of which are incorporated by reference herein. This database is comprised by spectral measurement of 170 objects. In that regard, for purposes of conciseness, the full database is not shown in FIG. 9. The database is one example of a pre-loaded set of spectral profiles in the form of computed eigenvectors and a look-up table (LUT) with typical spectral signatures (coefficients of eigenvectors) of most commonly imaged objects, such as skin, hair, vegetation, sky, etc.

Eigenvector analysis is performed for this collection of spectral reflectances, and the first 6 eigenvectors are shown in FIG. 10.

In step 457, the spectral profile information for the scene is matched against the database.

In particular, the coefficients of eigenvectors calculated in step 455 for the captured black hair data A_hair=[0.006, −0.011, −0.001, −0.007, 0.017, 0.118] and the dark skin data A_skin=[0.0002, −0.029, −0.027, −0.035, −0.043, 0.429] are compared with the plural profiles of spectral signatures accessed in step 404 to see if there are matches with spectral signatures of pre-identified objects in the database. If there are matches, the respective spectral signatures are then used to segment areas of the region of interest with different spectral properties.

In that regard, the spectral profiles may be spectral profiles having a relatively low number of spectral components. For example, the spectral profiles can also be low-resolution spectral profiles having three (3) or less components. In particular, it may be unnecessary and impractical to attempt to specifically identify the exact material for each object in the region of interest. For example, outside of a specific setting in which all potential materials are known, it may not be possible to specifically identify an exact material, as this would require an enormous database of plural spectral profiles for all possible materials.

Nevertheless, spectral profiles with a relatively low number of spectral components still can be used to differentiate between distinct areas made up of different materials, so that an artist or photographer can easily locate these areas for post-capture rendering. Thus, the artist or photographer has the additional metadata identifying locations of different materials in the scene as a resource for rendering the scene.

In step 458, materials for objects in the region of interest are identified, using matches between the spectral profile information for the region of interest against the database. For example, if the coefficients of an object match (or are within a given similarity range as) the coefficients of a curve in the database, the material corresponding to the matching curve in the database is assigned to the relevant spectral profile information.

In step 459, metadata which identifies materials for objects in the region of interest is constructed. Using the metadata, it is possible to determine a location of one or more objects in the region of interest comprised of a particular identified material. The metadata may also identify the location of the region of interest relative to the rest of the scene. After the image is captured, the material metadata can be read by a photo edition program and an image layer that superimposes the original image can be created that contains the spectral signatures for each material. This layer can be used to automatically segment each region with different material making easy for the user to distinguish regions of the image with different materials and do appropriate edition and rendering for each segmented region. Another application is material edition, a process in which the user of a photo edition program can easily identify and segment areas of the image and change the material. This metadata also enables other applications such as identification of materials in the scene by comparing the spectral signature to a database of spectral signatures.

In step 460, the constructed metadata is stored. For example, the metadata can be embedded with the image data for the scene. In that regard, the metadata can be embedded as additional data for each pixel in the region of interest. This method may be useful in a wide assortment of situations, as the pixel data can be compressed and offloaded to an application (or elsewhere) for processing. Alternatively, the metadata can be embedded by constructing an array for each respective material corresponding to pixels in the region of interest, and indicating pixels of that material with values in the array. This latter method may be more efficient in scenes with a relatively small number of materials. In one example, the metadata can be constructed as a spatial mask, and this spatial mask can be used as a metadata that is superimposed over the captured RGB image of the region of interest.

In step 461, there is a determination of whether another region of interest is to be selected by the user. For example, the photographer may notice another region of the scene for which the photographer wishes to differentiate between materials. If the user wishes to select another region of interest, the process proceeds to step 454 to designate another region of interest.

In one embodiment, in a case that the metadata identifies multiple sub-regions comprised of different materials in the designated region of interest, the sub-regions are made available for designation as separate regions of interest in a subsequent designation of a region of interest. Thus, iteration of the above processes can provide better differentiation even at the point of selecting a ROI.

If another region of interest is not to be selected, the process proceeds to step 462.

In step 462, the stored image data for the region of interest is rendered by using the metadata that identifies the material for objects in the region of interest. Thus, image data having similar tri-stimulus values can rendered differently in dependence on the metadata. For example, using the example above, an artist could use the information indicating the respective locations of the hair and skin to adjust shadow detail or other effects for the hair and skin appropriately (and separately). In one example, management of image data having similar tri-stimulus values is directed differently in an output-referred color space in dependence on the metadata. For example, a photographer could use the located materials to separate the region of interest into separate layers, which could then be adjusted independently, e.g., in Adobe Photoshop™. In one practical example, cosmetics with different spectral signatures can be respectively applied to different people in a region of interest, and the metadata can be used to identify a person in the region of interest using the spectral signature of a cosmetic applied to that person.

Figure 11:
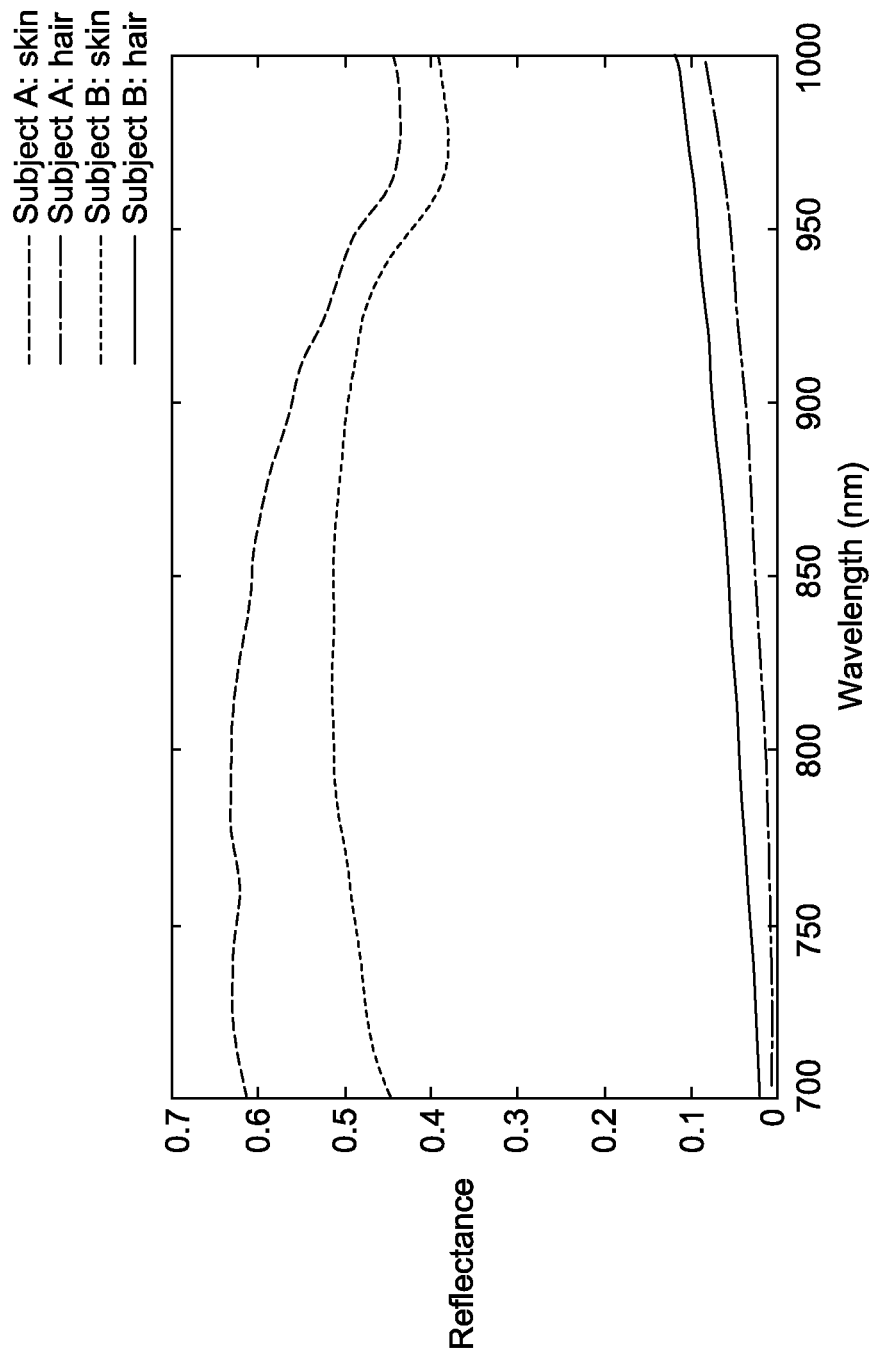
FIG. 11 is a view for explaining the use of spectral reflectances to identify distinct areas in a captured image.

FIG. 11 is a view for explaining the use of spectral reflectances to identify distinct areas in a captured image.

In particular, FIG. 11 depicts different spectral reflectance curves for skin and hair of two separate subjects. As can be seen from FIG. 11, the respective skin and hair of subjects A and B clearly have different spectral reflectances. Thus, according to the arrangements described above, the location of one or more objects or regions in the scene comprised of these materials can be distinctly identified.

Figure 13:
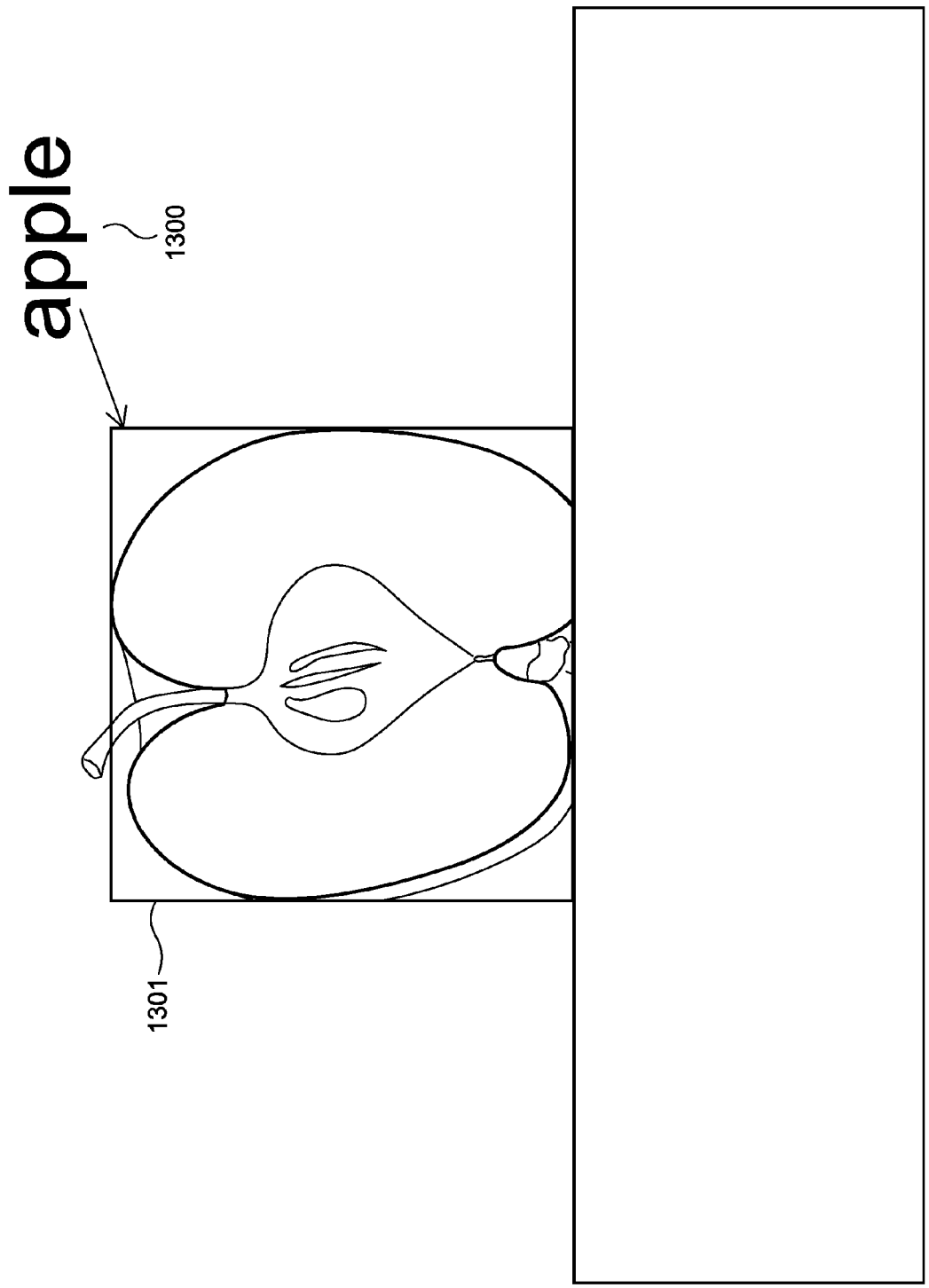

FIGS. 12 and 13 are views for explaining metadata according to example embodiments.

In particular, FIG. 12 shows a table 1202 which describes different types of metadata, as discussed above with respect to FIG. 4A. Meanwhile, as shown in FIG. 13, a rectangle 1301 may be shown by using the coordinates information shown in FIG. 12. For example, the text information 1300 ("apple") may be shown by using a coefficient eigenvector from the metadata as shown in FIG. 12. In one example, information regarding coefficient eigenvectors and corresponding text information (e.g., "apple") can be stored in a table in a memory.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

By matching spectral profiles of objects in a scene so as to identify materials for the objects, and storing the materials in metadata together with image data for the scene for use during post-capture rendering, it is ordinarily possible to automatically identify distinct areas of an image for separate post-processing, without requiring the intervention of an artist or photographer.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture method comprising:
capturing image data of a scene, wherein the image data is comprised of tri-stimulus device independent image data;
obtaining spectral profile information for the scene;
accessing a database of plural spectral profiles each of which maps a material to a corresponding spectral profile reflected therefrom;
matching the spectral profile information for the scene against the database;
identifying materials for objects in the scene by using matches between the spectral profile information for the scene against the database;
constructing metadata which identifies materials for objects in the scene;
embedding the metadata with the image data for the scene; and
using the metadata to differentiate materials in the scene during post-capture rendering; and
rendering the image data for the scene by using the metadata that identifies the material for objects in the scene, wherein image data having similar tri-stimulus values is rendered differently in dependence on the metadata.

2. The method according to claim 1, wherein the spectral profiles are comprised of six or less spectral components.

3. The method according to claim 1, wherein the spectral profile information for the scene is calculated from the captured image data of the scene.

4. The method according to claim 1, wherein management of image data having similar tri-stimulus values is directed differently in an output-referred color space in dependence on the metadata.

5. The method according to claim 1, wherein the metadata is embedded as additional data for each pixel in the scene.

6. The method according to claim 1, wherein the metadata is embedded by constructing an array corresponding to pixels in the image for each respective material, and indicating pixels of that material with values in the array.

7. The method according to claim 1, wherein cosmetics with different spectral signatures are respectively applied to different people in the scene, and wherein the metadata is used to identify a person in the scene using the spectral signature of a cosmetic applied to that person.

8. The method according to claim 1, further comprising determining a location of one or more objects in an image of the scene comprised of a particular identified material.

9. An image capture apparatus, comprising:
a computer-readable memory constructed to store computer-executable process steps; and
a processor constructed to execute the computer-executable process steps stored in the memory;
wherein the process steps stored in the memory cause the processor to:
capture image data of a scene, wherein the image data is comprised of tri-stimulus device independent image data;
obtain spectral profile information for the scene;
access a database of plural spectral profiles each of which maps a material to a corresponding spectral profile reflected therefrom;
match the spectral profile information for the scene against the database;
identify materials for objects in the scene by using matches between the spectral profile information for the scene against the database;
construct metadata which identifies materials for objects in the scene;
embed the metadata with the image data for the scene; and
use the metadata to differentiate materials in the scene during post-capture rendering; and
render the image data for the scene by using the metadata that identifies the material for objects in the scene, wherein image data having similar tri-stimulus values is rendered differently in dependence on the metadata.

10. The apparatus according to claim 9, wherein the spectral profiles are comprised of six or less spectral components.

11. The apparatus according to claim 9, wherein the spectral profile information for the scene is calculated from the captured image data of the scene.

12. The apparatus according to claim 9, wherein management of image data having similar tri-stimulus values is directed differently in an output-referred color space in dependence on the metadata.

13. The apparatus according to claim 9, wherein the metadata is embedded as additional data for each pixel in the scene.

14. The apparatus according to claim 9, wherein the metadata is embedded by constructing an array corresponding to pixels in the image for each respective material, and indicating pixels of that material with values in the array.

15. The apparatus according to claim 9, wherein cosmetics with different spectral signatures are respectively applied to different people in the scene, and wherein the metadata is used to identify a person in the scene using the spectral signature of a cosmetic applied to that person.

16. The apparatus according to claim 9, wherein the process steps further cause the computer to determine a location of one or more objects in an image of the scene comprised of a particular identified material.

17. An image capture module stored on a non-transitory computer-readable storage medium, comprising:
a capture module for capturing image data of a scene, wherein the image data is comprised of tri-stimulus device independent image data;
a obtaining module for obtaining spectral profile information for the scene;
an access module for accessing a database of plural spectral profiles each of which maps a material to a corresponding spectral profile reflected therefrom;
a matching module for matching the spectral profile information for the scene against the database;
an identification module for identifying materials for objects in the scene by using matches between the spectral profile information for the scene against the database;

a construction module for constructing metadata which identifies materials for objects in the scene;

an embedding module for embedding the metadata with the image data for the scene; and a differentiation module for using the metadata to differentiate materials in the scene during post-capture rendering, wherein the image data for the scene is rendered by using the metadata that identifies the material for objects in the scene, wherein image data having similar tri-stimulus values is rendered differently in dependence on the metadata.

18. The module according to claim 17, wherein the spectral profiles are comprised of six or less spectral components.

19. The module according to claim 17, wherein the spectral profile information for the scene is calculated from the captured image data of the scene.

20. The module according to claim 17, wherein management of image data having similar tri-stimulus values is directed differently in an output-referred color space in dependence on the metadata.

21. The module according to claim 17, wherein the metadata is embedded as additional data for each pixel in the scene.

22. The module according to claim 17, wherein the metadata is embedded by constructing an array corresponding to pixels in the image for each respective material, and indicating pixels of that material with values in the array.

23. The module according to claim 17, wherein cosmetics with different spectral signatures are respectively applied to different people in the scene, and wherein the metadata is used to identify a person in the scene using the spectral signature of a cosmetic applied to that person.

24. The module according to claim 17, further comprising a location determination module for determining a location of one or more objects in an image of the scene comprised of a particular identified material.

25. A non-transitory computer-readable storage medium retrievably storing computer-executable process steps for causing a computer to perform an image capture method, the method comprising:

capturing image data of a scene, wherein the image data is comprised of tri-stimulus device independent image data;

obtaining spectral profile information for the scene;

accessing a database of plural spectral profiles each of which maps a material to a corresponding spectral profile reflected therefrom;

matching the spectral profile information for the scene against the database;

identifying materials for objects in the scene by using matches between the spectral profile information for the scene against the database;

constructing metadata which identifies materials for objects in the scene;

embedding the metadata with the image data for the scene;

using the metadata to differentiate materials in the scene during post-capture rendering; and rendering of the image data for the scene by using the metadata that identifies the material for objects in the scene, wherein image data having similar tri-stimulus values is rendered differently in dependence on the metadata.

26. The computer-readable storage medium according to claim 25, wherein the spectral profiles are comprised of six or less spectral components.

27. The computer-readable storage medium according to claim 25, wherein the spectral profile information for the scene is calculated from the captured image data of the scene.

28. The computer-readable storage medium according to claim 25, wherein management of image data having similar tri-stimulus values is directed differently in an output-referred color space in dependence on the metadata.

29. The computer-readable storage medium according to claim 25, wherein the metadata is embedded as additional data for each pixel in the scene.

30. The computer-readable storage medium according to claim 25, wherein the metadata is embedded by constructing an array corresponding to pixels in the image for each respective material, and indicating pixels of that material with values in the array.

31. The computer-readable storage medium according to claim 25, wherein cosmetics with different spectral signatures are respectively applied to different people in the scene, and wherein the metadata is used to identify a person in the scene using the spectral signature of a cosmetic applied to that person.

32. The computer-readable storage medium according to claim 25, wherein the method further comprises determining a location of one or more objects in an image of the scene comprised of a particular identified material.

33. An image capture method comprising:

capturing preview image data of a scene;

accepting a designation of a region of interest in the preview image data;

capturing spectral image data of the scene;

calculating spectral profile information for the region of interest by using the captured spectral image data for the scene;

accessing a database of plural spectral profiles of which each profile maps a material to a corresponding spectral profile reflected therefrom;

matching the spectral profile information for the region of interest against the database;

identifying materials for objects in the region of interest by using matches between the spectral profile information for the region of interest against the database;

constructing metadata which identifies materials for objects in the region of interest and which identifies location of the region of interest relative to the scene;

storing the metadata together with image data for the scene, wherein the stored image data is comprised of tri-stimulus device independent image data derived from the captured spectral image data;

using the metadata to differentiate materials in the scene during post-capture rendering; and rendering the stored image data for the region of interest by using the metadata that identifies the material for objects in the region of interest, wherein image data having similar tri-stimulus values is rendered differently in dependence on the metadata.

34. The method according to claim 33, wherein the spectral profiles have three (3) or less components.

35. The method according to claim 33, wherein the stored image data is comprised of the captured spectral image data.

36. The method according to claim 33, wherein in a case that the metadata identifies multiple sub-regions comprised of different materials in the designated region of interest, the sub-regions are made available for designation as separate regions of interest in a subsequent designation of a region of interest.

37. An image capture apparatus, comprising:
a computer-readable memory constructed to store computer-executable process steps; and
a processor constructed to execute the computer-executable process steps stored in the memory;
wherein the process steps stored in the memory cause the processor to:
capture preview image data of a scene;
accept a designation of a region of interest in the preview image data;
capture spectral image data of the scene;
calculate spectral profile information for the region of interest by using the captured spectral image data for the scene;
access a database of plural spectral profiles of which each profile maps a material to a corresponding spectral profile reflected therefrom;
match the spectral profile information for the region of interest against the database;
identify materials for objects in the region of interest by using matches between the spectral profile information for the region of interest against the database;
construct metadata which identifies materials for objects in the region of interest and which identifies location of the region of interest relative to the scene;
store the metadata together with image data for the scene, wherein the stored image data is comprised of tri-stimulus device independent image data derived from the captured spectral image data; and
use the metadata to differentiate materials in the scene during post-capture rendering,
wherein the process steps further cause the processor to render the stored image data for the region of interest by using the metadata that identifies the material for objects in the region of interest, and wherein image data having similar tri-stimulus values is rendered differently in dependence on the metadata.

38. The apparatus according to claim 37, wherein the spectral profiles have three (3) or less components.

39. The apparatus according to claim 37, wherein the stored image data is comprised of the captured spectral image data.

40. The apparatus according to claim 37, wherein in a case that the metadata identifies multiple sub-regions comprised of different materials in the designated region of interest, the sub-regions are made available for designation as separate regions of interest in a subsequent designation of a region of interest.

41. An image capture module stored on a non-transitory computer-readable storage medium, comprising:
a preview capture module for capturing preview image data of a scene;
a designation module for accepting a designation of a region of interest in the preview image data;
a spectral capture module for capturing spectral image data of the scene;
a calculation module for calculating spectral profile information for the region of interest by using the captured spectral image data for the scene;
an access module for accessing a database of plural spectral profiles of which each profile maps a material to a corresponding spectral profile reflected therefrom;
a matching module for matching the spectral profile information for the region of interest against the database;
an identification module for identifying materials for objects in the region of interest by using matches between the spectral profile information for the region of interest against the database;
a construction module for constructing metadata which identifies materials for objects in the region of interest and which identifies location of the region of interest relative to the scene;
a storage module for storing the metadata together with image data for the scene, wherein the stored image data is comprised of tri-stimulus device independent image data derived from the captured spectral image data; and
a differentiation module for using the metadata to differentiate materials in the scene during post-capture rendering,
wherein the stored image data for the region of interest is rendered by using the metadata that identifies the material for objects in the region of interest, and wherein image data having similar tri-stimulus values is rendered differently in dependence on the metadata.

42. The image capture module according to claim 41, wherein the spectral profiles have three (3) or less components.

43. The image capture module according to claim 41, wherein the stored image data is comprised of the captured spectral image data.

44. The image capture module according to claim 41, wherein in a case that the metadata identifies multiple sub-regions comprised of different materials in the designated region of interest, the sub-regions are made available for designation as separate regions of interest in a subsequent designation of a region of interest.

45. A non-transitory computer-readable storage medium retrievably storing computer-executable process steps for causing a computer to perform an image capture method, the method comprising:
capturing preview image data of a scene;
accepting a designation of a region of interest in the preview image data;
capturing spectral image data of the scene;
calculating spectral profile information for the region of interest by using the captured spectral image data for the scene;
accessing a database of plural spectral profiles of which each profile maps a material to a corresponding spectral profile reflected therefrom;
matching the spectral profile information for the region of interest against the database;
identifying materials for objects in the region of interest by using matches between the spectral profile information for the region of interest against the database;
constructing metadata which identifies materials for objects in the region of interest and which identifies location of the region of interest relative to the scene;
storing the metadata together with image data for the scene, wherein the stored image data is comprised of tri-stimulus device independent image data derived from the captured spectral image data; and
using the metadata to differentiate materials in the scene during post-capture rendering,
wherein the method further comprises rendering of the stored image data for the region of interest by using the metadata that identifies the material for objects in the region of interest, and wherein image data having similar tri-stimulus values is rendered differently in dependence on the metadata.

46. The computer-readable storage medium according to claim 45, wherein the spectral profiles have three (3) or less components.

47. The computer-readable storage medium according to claim 45, wherein the stored image data is comprised of the captured spectral image data.

48. The computer-readable storage medium according to claim 45, wherein in a case that the metadata identifies multiple sub-regions comprised of different materials in the designated region of interest, the sub-regions are made available for designation as separate regions of interest in a subsequent designation of a region of interest.

* * * * *